(12) United States Patent
Wang et al.

(10) Patent No.: US 8,023,958 B2
(45) Date of Patent: Sep. 20, 2011

(54) USER PLANE-BASED LOCATION SERVICES (LCS) SYSTEM, METHOD AND APPARATUS

(75) Inventors: Jun Wang, La Jolla, CA (US); Leonid Sheynblat, Hillsborough, CA (US); Parag Agahse, San Diego, CA (US); Randall Gellens, San Diego, CA (US); Raymond Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/792,062

(22) Filed: Mar. 2, 2004

(65) Prior Publication Data

US 2004/0242238 A1    Dec. 2, 2004

Related U.S. Application Data

(60) Provisional application No. 60/452,358, filed on Mar. 5, 2003, provisional application No. 60/452,914, filed on Mar. 7, 2003, provisional application No. 60/460,839, filed on Apr. 5, 2003.

(51) Int. Cl.
    *H04W 4/00* (2009.01)
(52) U.S. Cl. ............... 455/456.1; 455/456.2; 455/456.3; 455/456.4; 455/456.5; 455/456.6; 455/457; 455/435.1; 455/411; 380/258; 709/203; 709/223; 709/225
(58) Field of Classification Search ............... 455/456.1, 455/456.6, 411, 456.2, 456.3, 456.4, 456.5, 455/457; 380/285, 258; 709/203, 223, 225
See application file for complete search history.

(56) References Cited

U.S. PATENT DOCUMENTS 6,064,741 A * 5/2000 Horn et al. ............... 380/285
(Continued)

FOREIGN PATENT DOCUMENTS

EP    1276336    1/2003
(Continued)

OTHER PUBLICATIONS

ETSI Standards, "Digital Cellular Telecommunications System (Phase 2+); Universal Mobile Telecommunications System (UTMS); Location Services (LCS); Functional description; Stage 2", ETSI Standards, European Telecommunications Standards Institute, vol. 3-SA2, No. V550, Dec. 2002 pp. 1-76.

(Continued)

*Primary Examiner* — Pierre-Louis Desir
(74) *Attorney, Agent, or Firm* — Donald C. Kordich; Thien T. Nguyen

(57) ABSTRACT

A system, method and apparatus for providing location services whereby location determination and location disclosure are treated as separate and independent processes. Location determination may be performed (as necessary) via a first set of network entities to obtain location information for a mobile station. The location information may be cached for subsequent disclosure to any number of applications. Location disclosure may be performed (when requested) via a second set of network entities to provide the location information. Location determination may utilize a first security procedure for authentication and authorization and to obtain a first session key used for location determination. Location disclosure may utilize a second security procedure for authentication and authorization and to obtain a second session key used for location disclosure. For a roaming mobile station, location determination may be performed via a serving network and location disclosure may be performed via a home network.

25 Claims, 15 Drawing Sheets

U.S. PATENT DOCUMENTS

| | | | |
|---|---|---|---|
| 6,169,899 B1 | 1/2001 | Havinis et al. | 455/433 |
| 6,185,427 B1 | 2/2001 | Krasner et al. | 455/456 |
| 6,195,557 B1 | 2/2001 | Havinis et al. | 455/456 |
| 6,385,458 B1 * | 5/2002 | Papadimitriou et al. | 455/456.2 |
| 2001/0009544 A1 | 7/2001 | Vanttinen et al. | 370/338 |
| 2001/0055394 A1 * | 12/2001 | Vanttinen et al. | 380/258 |
| 2002/0004399 A1 * | 1/2002 | McDonnell et al. | 455/456 |
| 2002/0019698 A1 | 2/2002 | Vilppula et al. | 701/207 |
| 2002/0077119 A1 * | 6/2002 | Fitch et al. | 455/456 |
| 2002/0086682 A1 | 7/2002 | Naghian | 455/456 |
| 2003/0023726 A1 * | 1/2003 | Rice et al. | 709/225 |
| 2003/0035544 A1 * | 2/2003 | Herle et al. | 380/270 |
| 2003/0119481 A1 * | 6/2003 | Haverinen et al. | 455/411 |
| 2003/0125044 A1 * | 7/2003 | Deloach et al. | 455/456 |
| 2004/0142702 A1 * | 7/2004 | Hefner et al. | 455/456.1 |
| 2004/0203900 A1 * | 10/2004 | Cedervall et al. | 455/456.1 |
| 2004/0248551 A1 * | 12/2004 | Rowitch et al. | 455/410 |

FOREIGN PATENT DOCUMENTS

| | | |
|---|---|---|
| WO | WO9625830 | 8/1996 |
| WO | WO0025545 | 5/2000 |
| WO | WO0039987 | 7/2000 |
| WO | 0076171 | 12/2000 |
| WO | 0137477 | 5/2001 |
| WO | 01056320 | 6/2001 |
| WO | 02076118 | 9/2002 |
| WO | 03045084 | 5/2003 |
| WO | 2004075591 | 9/2004 |

OTHER PUBLICATIONS

International Search Report—PCT/US04/006737, International Search Authority—European Patent Office, Dec. 30, 2004.

Written Opinion—PCT/US04/006737, International Search Authority—European Patent Office, Dec. 30, 2004.

International Preliminary Report on Patentability—PCT/US04/006737, IPEA—US, Jun. 10, 2005.

Plaintiff's Fourth Amended Complaint, Case 3:08-cv-01992-MMA-POR, Document 53, pp. 1-33, Jan. 11, 2010.

Defendant Qualcomm Incorporated, Snaptrack, Inc., and Norman Krasner's Answer to Fourth Amended Complaint Case 3:08-cv-01992-MMA-POR, Document 54, pp. 1-26, Jan. 21, 2010.

Order Rescheduling Early Neutral Evaluation, Case 3:08-cv-01992-MMA-POR, Document 57, p. 1, Mar. 1, 2010.

Plaintiff's Original Complaint, Case:3:08-cv-01992-BEN-NLS, pp. 1-34, Oct. 24, 2008.

Plaintiff's First Amended Complaint, Case:3:08-cv-01992-MMA-POR, Document 14, pp. 1-39, Apr. 29, 2009.

Plaintiff's Second Amended Complaint, Case:3:08-cv-01992-MMA-POR, Document 36,, pp. 1-40, Sep. 14, 2009.

Plaintiff's Third Amended Complaint, Case:3:08-cv-01992-MMA-POR, Document 40, pp. 1-35, Oct. 9, 2009.

* cited by examiner

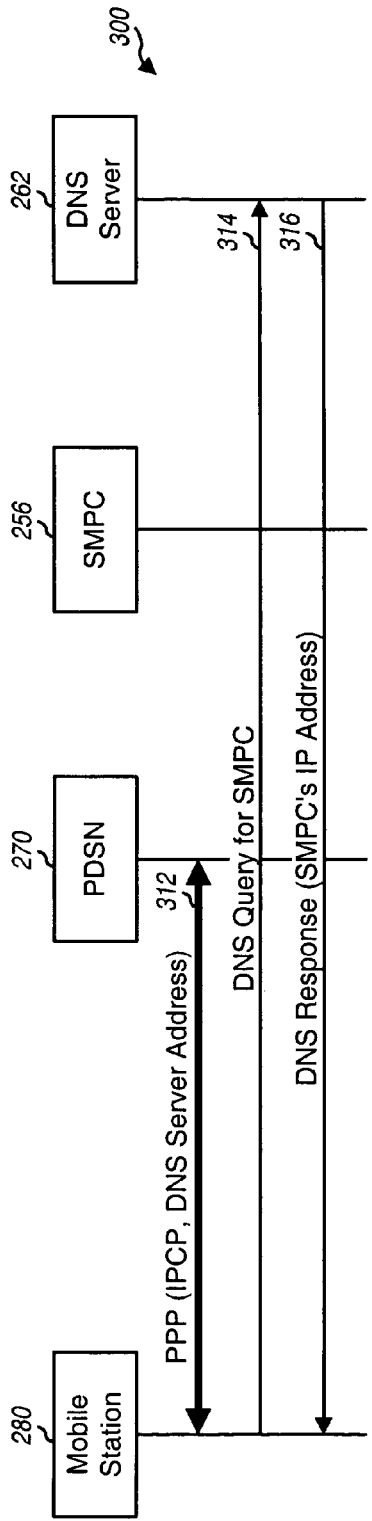
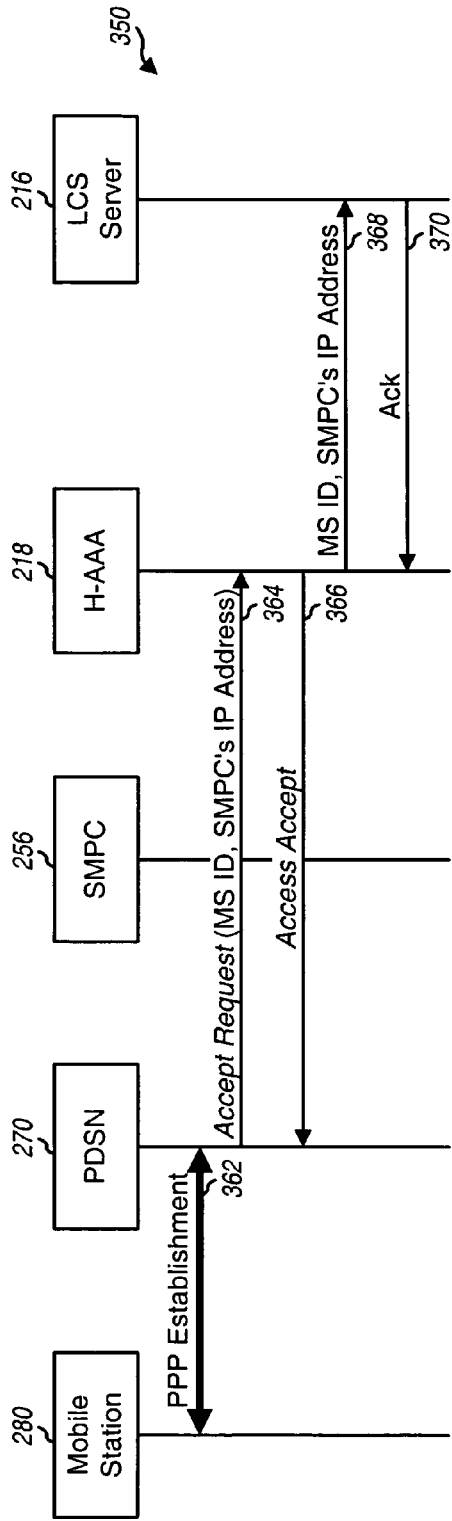

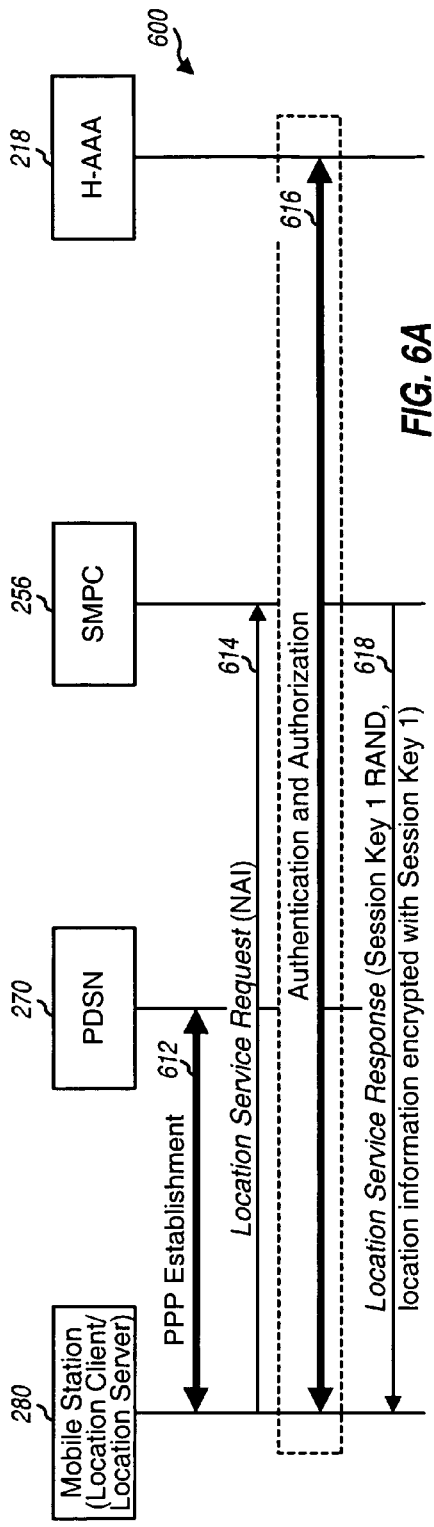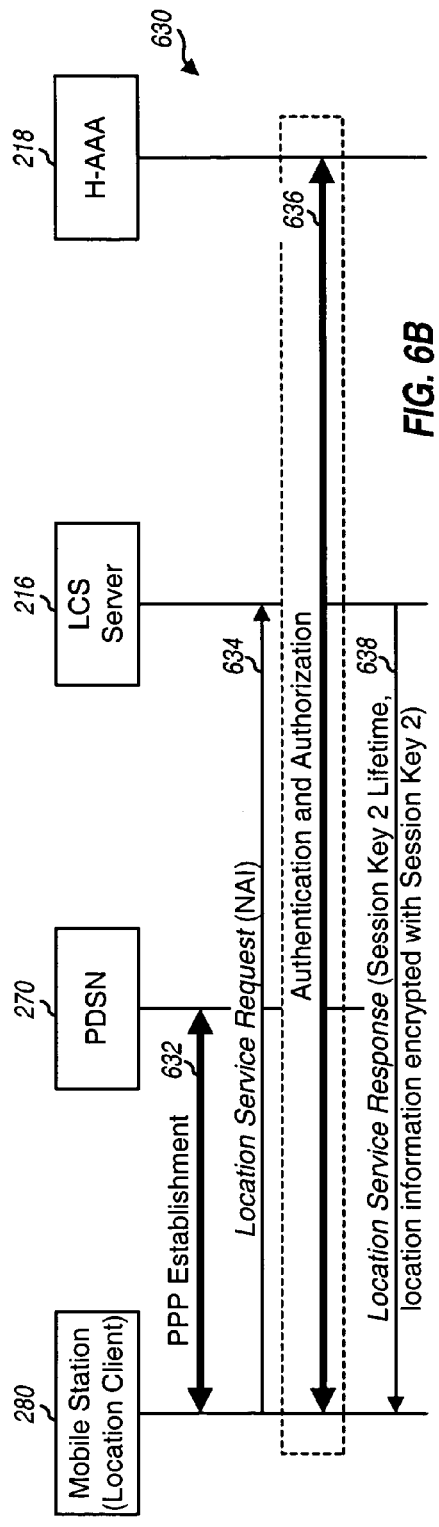

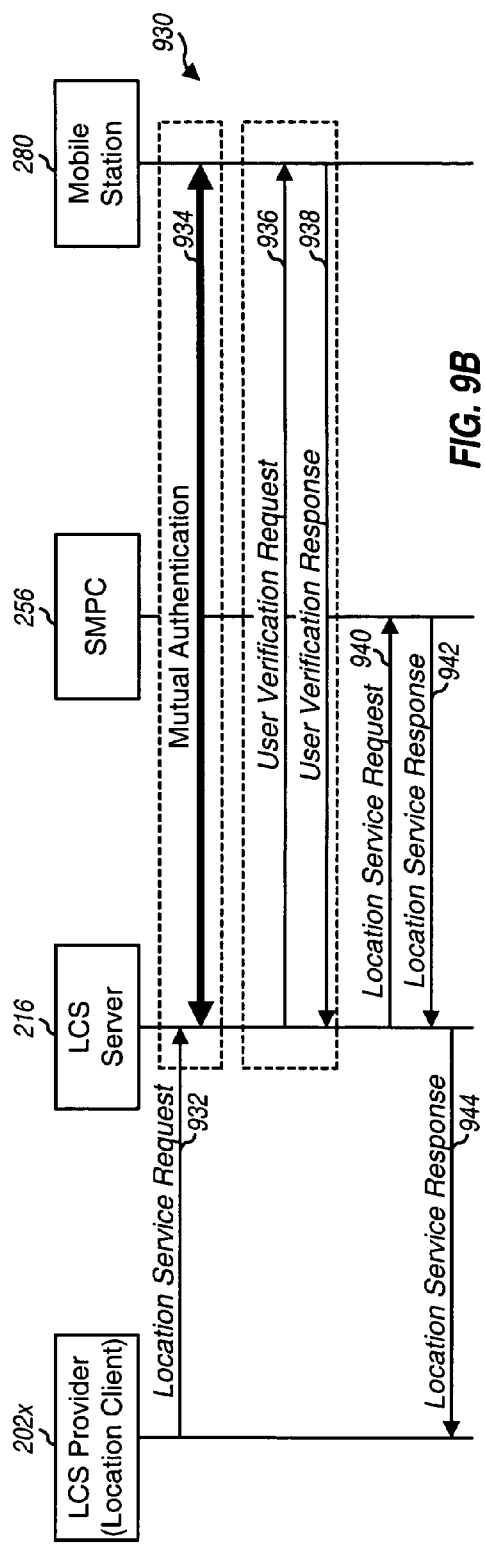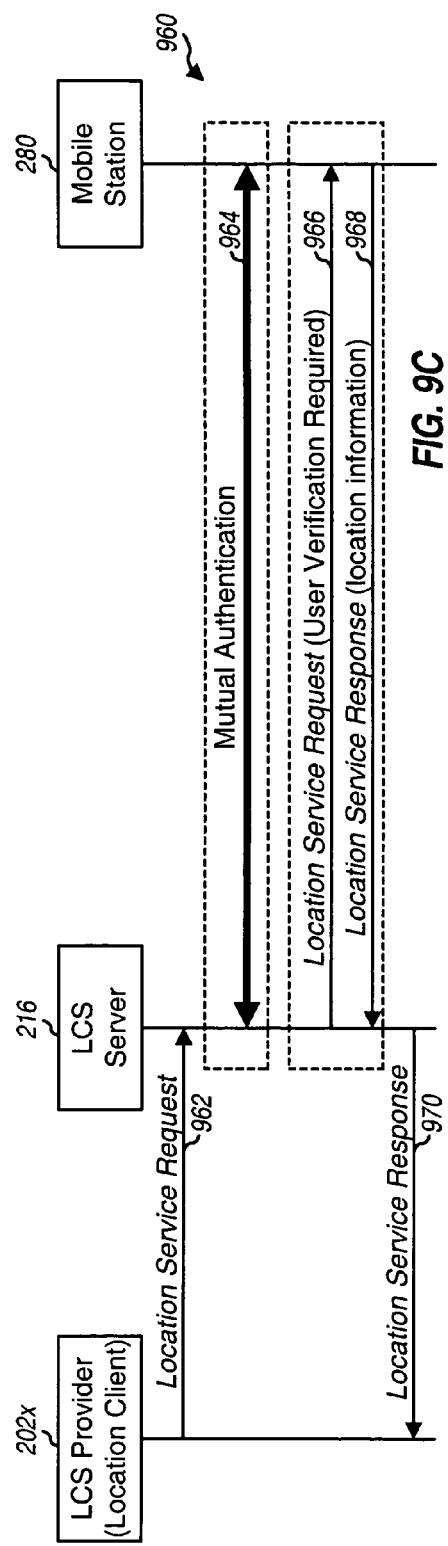

USER PLANE-BASED LOCATION SERVICES (LCS) SYSTEM, METHOD AND APPARATUS

RELATED APPLICATIONS

This application claims priority to U.S. Provisional Application No. 60/452,358, filed on Mar. 5, 2003, U.S. Provisional Application No. 60/452,914, filed on. Mar. 7, 2003 and U.S. Provisional Application No. 60/460,839, filed on Apr. 5, 2003.

BACKGROUND

1. Field

The present invention relates generally to communication, and more specifically to a system, method and apparatus for performing location determination and providing location information via a user plane-based location services (LCS) architecture.

2. Background

It is often desirable, and sometimes necessary, to know the location of a wireless user. For example, the Federal Communications Commission (FCC) has adopted a report and order for an enhanced 911 (E-9-1-1) wireless service that requires the location of a mobile station (e.g., a cellular phone) to be provided to a Public Safety Answering Point (PSAP) each time a 911 call is made from the mobile station. In addition to the FCC mandate, a network operator/service provider may support various applications that use location services, which are services that can provide the location of mobile stations. Such applications may include, for example, location-sensitive billing, asset tracking, asset monitoring and recovery, fleet and resource management, personal-location services, and so on. Some examples of applications for personal-location services include (1) providing a local map to a mobile station based on its location, (2) providing a recommendation for a facility (e.g., a hotel or a restaurant) based on the mobile station's location, and (3) providing directions to the recommended facility from the mobile station's location.

In many conventional wireless communication networks, the determination of a mobile station's location and the use of this location are integrated. That is, if an application requires the mobile station's location, then a procedure is initiated to determine and report the mobile station's location for use by this application. This integrated design is undesirable for several reasons. First, if multiple applications require the location of a mobile station, then the mobile station's location may need to be determined multiple times, once for each of these applications. This results in inefficient use of precious system resources. Second, a network entity designated with managing the determination and reporting of location of mobile stations may need to be redesigned whenever a new application is added by a service provider.

There is therefore a need in the art for a system, method, and apparatus that can more efficiently perform location determination and provide location information for mobile stations.

SUMMARY

A system, method and apparatus are described herein capable of efficiently providing location services. The system, method and apparatus are based on an LCS architecture whereby location determination and location disclosure are treated as separate and independent processes. Location determination refers to the determination of location information for a mobile station. This location information may comprise a location estimate for the mobile station, an accuracy or uncertainty in the location estimate, other pertinent information, or a combination thereof. Location disclosure refers to the disclosure of the location information to applications that request the location information.

Location determination may be performed via a first set of network entities using protocols and mechanisms in a "location determination" layer. Various procedures and call flows may be used to perform location determination, as described below. The specific call flow to use for location determination is dependent on (1) whether the request for location determination originates from the mobile station or the network, and (2) the particular method used to determine the location of the mobile station (e.g., an IS-801 based method or a cell-ID method). The location information obtained from performing location determination may be cached (i.e., stored in a memory unit) in the mobile station and/or network entities for future use.

Location disclosure may be performed via a second set of network entities using protocols and mechanisms in a "location disclosure" layer, which resides on top of the location determination layer. Similarly, various procedures and call flows may be used to perform location disclosure. The specific call flow to use for location disclosure may be dependent on (1) whether the request for location disclosure originates from the mobile station or the network, and (2) where the location information is cached.

Location determination may be performed as necessary. This may be, for example, when location information is needed, if the available location information is stale or does not meet requirements, and so on. Once obtained, the location information may be disclosed to any number of applications. Thus, location determination may be performed only once, while location disclosure may be performed multiple times to provide the location information to multiple applications. A call detail record (CDR) may be provided for each request for location determination, and a CDR may also be provided for each request for location disclosure. The CDRs may be used for accounting, billing, and/or other purposes.

Location determination may utilize a first security procedure for (1) authentication and authorization and (2) session key setup to obtain a first session key. The first session key may be used to authenticate and/or encrypt messages exchanged for location determination. Location disclosure may utilize a second security procedure for (1) authentication and authorization and (2) session key setup to obtain a second session key. The second session key may be used to authenticate and/or encrypt messages exchanged for location disclosure. The first and second security procedures may use the same or different security algorithms. For example, the first security procedure may utilize an MD-5 algorithm, and the second security procedure may utilize an Authentication and Key Agreement (AKA) procedure. For a mobile station that has roamed outside of its home network, location determination may be performed via a serving network and location disclosure may be performed via the home network. The first session key may be used with network entities in the serving network, and the second session key may be used with network entities in the home network.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 3A and 3B show call flows that may be for a mobile station and an LCS server, respectively, to obtain the IP address of an SMPC;

FIGS. 6A through 6C show call flows for performing mobile-originated location disclosure with the location server and location information being located and cached in different entities;

FIG. 7 shows a call flow to set up the IP address of a mobile station that is not always on;

FIGS. 9A through 9C show call flows for performing mobile-terminated location disclosure with the location server and location information being located and cached in different entities;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. Moreover, in the following description, "location" and "position" are synonymous terms that are used interchangeably.

Figure 1A:
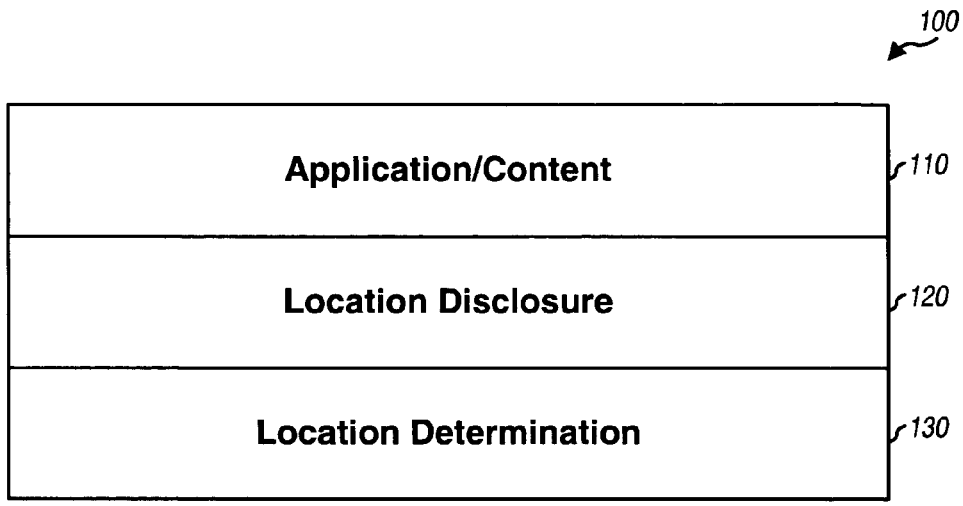
FIGS. 1A and 1B show a user plane-based LCS architecture.

FIG. 1A shows a user plane-based location services (LCS) architecture 100 that can more efficiently provide location services. A user plane is a mechanism that can carry data for higher-layer applications. A user plane may be made up of various protocols, such as User Datagram Protocol (UDP), Transmission Control Protocol (TCP), and Internet Protocol (IP), all of which are well known in the art. The protocols on the user plane typically rely on other protocols on a (lower) control plane in order to function properly.

LCS architecture 100 includes an application/content layer 110, a location disclosure layer 120, and a location determination layer 130. Applications in layer 110 utilize location information to provide location dependent services. The location information may comprise a location estimate for each of one or more LCS targets, an accuracy or uncertainty for each location estimate, or some other pertinent information, or a combination thereof. An LCS target is a mobile station whose location is being sought.

Location disclosure layer 120 includes protocols and mechanisms that may be used to disclose (i.e., provide) location information for target mobile stations. The applications in layer 110 may request for location information by invoking the protocols and mechanisms in layer 120. These protocols and mechanisms would then deliver the location information to the requesting applications. Location determination layer 130 includes protocols and mechanisms that may be used to determine (i.e., obtain) location information for target mobile stations. The protocols and mechanisms in layer 130 may be invoked by the protocols and mechanisms in layer 120, if and when necessary, to determine location information. The protocols and mechanisms in layers 120 and 130 are described in further detail below.

LCS architecture 100 is based on recognition that location determination and location disclosure are two independent processes that may be decoupled. This decoupled design for LCS architecture 100 can provide various advantages. First, LCS architecture 100 can easily support new applications without the need to modify or redesign the underlying location disclosure and location determination layers. Moreover, LCS architecture 100 can support various types of applications such as, for example, BREW (Binary Runtime Environment for Wireless), WAP (Wireless Application Protocol), SMS (Short Message Service), and Java applications. Second, location information may be disclosed to multiple applications without the need to separately and redundantly obtain this information. Third, separate procedures may be used for authentication, authorization, and accounting (AAA) for location determination and location disclosure to obtain various benefits, as described below.

Figure 2:
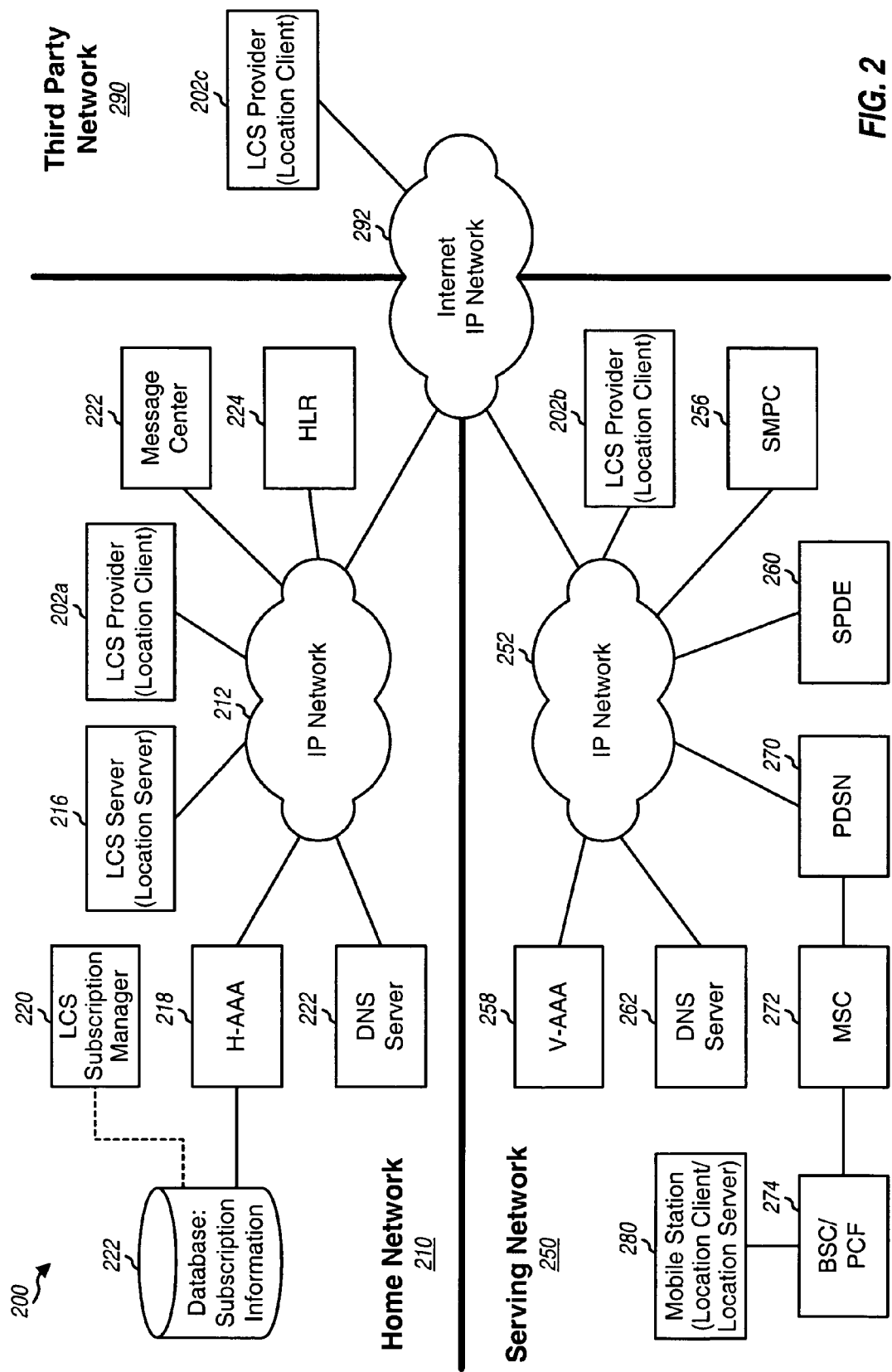
FIG. 2 shows a network that implements the LCS architecture in FIG. 1.

FIG. 2 shows a diagram of a network 200 that implements user plane-based LCS architecture 100. Network 200 includes a home network 210, a serving network 250, and a third party network 290. Home network 210 is a wireless communication network with which a mobile station 280 has registered. (A mobile station is also often referred to as a terminal, a mobile, a wireless device, a user equipment (UE), or some other terminology.) Serving network 250 is a wireless communication network via which mobile station 280 is currently receiving service. Serving network 250 is different from home network 210 if mobile station 280 is roaming and has moved outside the coverage of home network 210. Third party network 290 is a communication/data network that is not part of home network 210 or serving network 250. For example, third party network 290 may be a data network maintained by an Internet service provider.

Home network 210 includes various network entities that communicate with each other via an IP network 212. A network entity is a logical entity within a network and is designated to perform a particular function. Similarly, serving network 250 includes various network entities that communicate with each other via an IP network 252. IP networks 2-50 212 and 252 further couple to an Internet IP network 292. The network entities within home network 210, serving network 250, and third party network 290 may communicate with each other via IP networks 212, 252, and 292.

Within network 200, a "location client" and a "location server" are two functions that interact with each other for the purpose of disclosing location information. The location client requests location information for one or more LCS targets. The location server provides the location information to the requesting location client. The location client and location server may each reside in a mobile station or some other network entities. For example, the location client may reside in mobile station 280, an LCS provider 202a in home network 210, an LCS provider 202b in serving network 250, or an LCS provider 202c in third party network 290. An LCS provider is a network entity that uses location information to provide location services. The location server may reside in mobile station 280 or an LCS server 216 in home network 210. Mobile station 280 may serve as a location client, a location server, and/or an LCS target. For example, if an application within mobile station 280 needs the location of mobile station 280, then mobile station 280 would serve as both the location client and the LCS target. For simplicity, mobile station 280 is the LCS target in the description below.

Within home network 210, LCS server 216 is a network entity designated to serve as a location server for location disclosure. LCS server 216: interacts with a home authentication, authorization, and accounting entity (H-AAA) 218 to perform authentication and authorization for location disclosure. A database 222 is used to store subscription information for subscribers (i.e., users) of home network 210. Each user is normally required to have a "subscription" for each wireless communication network to which access is desired. A subscription comprises pertinent information needed to access a designated wireless communication network, such as subscriber/user identification information, security information, and so on. The subscription for each user is also referred to as a "subscriber profile" or a "user profile". The subscription information in database 222 may be updated by an LCS subscription manager 220 and accessed by H-AAA 218 for authentication, authorization, and accounting purposes. A message center 230 is responsible for storing, relaying, and forwarding SMS messages for mobile stations. A home location register (HLR) 224 stores registration information for mobile stations that have registered with home network 210.

Within serving network 250, a serving mobile positioning center (SMPC) 256 serves as the point of interface to serving network 250 for location determination. SMPC 256 interacts with H-AAA 218 to perform authentication and authorization for location determination. SMPC 256 also allows mobile stations to access a serving position determining entity (SPDE) 260 for location determination. SMPC 256 is optionally used to perform authentication and authorization of mobile station 280 in case mobile station 280 needs SPDE 260 as a resource for location determination. SPDE 260 determines the geographical location of an LCS target in accordance with a specified Position Quality of Service (PQoS). The PQoS specifies the accuracy of the LCS target's location, which may be imposed by the requesting application. Different PQoS requirements may necessitate the use of different location determination methods, as described below. A visited authentication, authorization, and accounting entity (V-AAA) 258 serves as a proxy of H-AAA 218 and may support authentication and authorization for location determination. A packet data serving node (PDSN) 270 is responsible for the establishment, maintenance, and termination of data sessions for mobile stations in serving network 250. A mobile switching center (MSC) 272 performs switching functions (i.e., routing of messages and data) for mobile stations within its coverage area. A base station controller (BSC)/packet control function (PCF) 274 controls the transmission of data between PDSN 270 and a base station with which mobile station 280 is currently in communication. A visitor location register (VLR) (not shown in FIG. 2) stores registration information for mobile stations that have registered with serving network 250.

Domain name system (DNS) servers 232 and 262 translate domain names (e.g., www.domain-name.com) into IP addresses (e.g., 204.62.131.129), which are required by network entities to communicate with each other via the IP networks. Each DNS server receives DNS queries from other network entities for IP addresses of domain names, determines the IP addresses for these domain names, and sends DNS responses with the IP addresses back to the, requesting network entities. A DNS server in a given network (e.g., DNS server 232) may exchange information with other DNS servers in other networks (e.g., DNS server 262) to obtain the requested IP addresses.

For simplicity, FIG. 2 only shows some of the network entities within home network 210 and some of the network entities within serving network 250. Home network 210 typically also includes network entities (e.g., a PDE and an MPC) that support location determination for mobile stations in communication with home network 210. Correspondingly, serving network 250 typically also includes network entities (e.g., LCS server 216 and LCS subscription manager 220) that support location disclosure for mobile stations whose home network is serving network 250. These additional network entities are not shown in FIG. 2 for simplicity. Moreover, networks 210 and 250 may each include multiple instances of each network entity. For example, serving network 250 may include multiple PDSNs.

FIG. 2 shows a logical view of network 200, which includes various network entities designated to perform specific functions. These network entities include LCS providers 202a1, 202b, and 202c, LCS server 216, H-AAA 218, SMPC 256, SPDE 260, and so on. The network entities are logical entities of their respective (home, serving, and third party) networks. The network entities shown in FIG. 2 may be implemented in various manners. Moreover, these network entities may be combined within the same hardware unit or may reside in different hardware units.

Figure 1B:
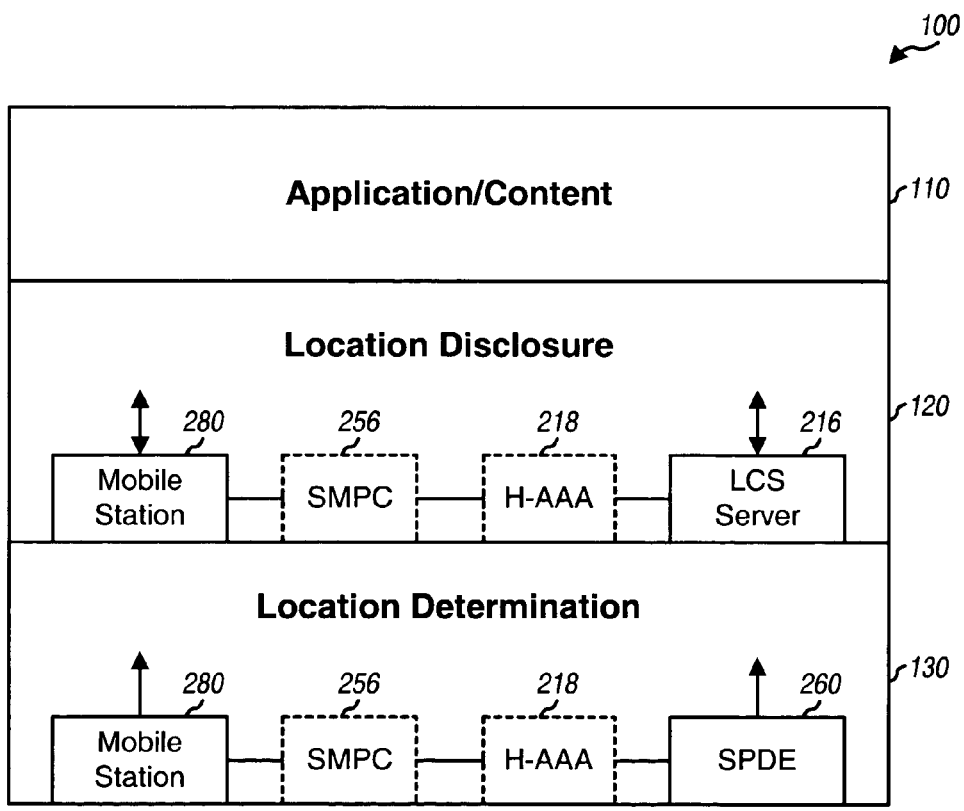

FIG. 1B shows an implementation of LCS architecture 100 with the network entities shown in FIG. 2. Location determination may be performed by a first set of network entities to determine location information for mobile station 280. The network entities that may be involved for location determination include mobile station 280, SPDE 260, SMPC 256, and H-AAA 218. SPDE 260 is involved if its assistance is needed for location determination. SMPC 256 may optionally be involved if assistance from SPDE 260 is needed for location determination. H-AAA 218 may optionally be involved if authentication and authorization is needed for location determination.

Location disclosure may be performed by a second set of network entities to disclose the location information for mobile station 280. The network entities that may be involved for location disclosure include mobile station 280, LCS server 216, SMPC 256, and H-AAA 218. SMPC 256 is optional and may be involved if the location information is cached (i.e., stored) in SMPC 256. H-AAA 218 is also optional and may be involved if authentication and authorization is needed for location disclosure.

Referring back to FIG. 2, the network entities within network 200 may communicate with each other via specially defined interfaces. Some of these interfaces are described below.

Location determination may utilize the following interfaces. An SPDE-MS interface is used to exchange information between mobile station 280 and SPDE 260 for location determination. The SPDE-MS interface is described in a document TIA/EIA/IS-IS-801, entitled "Position Determination Service Standards for Dual Mode Spread Spectrum Systems," which is publicly available. An SMPC-HAAA interface is used to send authentication and authorization information for location determination. H-AAA 218 may send subscriber information to SMPC 256 for authentication purposes. SMPC 256 may also send transaction information to H-AAA 218 for accounting and billing purposes, as described below. An SMPC-SPDE interface is used to exchange information between SPDE 260 and SMPC 256 for location determination. The SMPC-SPDE interface is described in a document TIA/EIA/PN-4747, entitled "Location Services Enhancements," and in a document J-036, both of which are publicly available. An SMPC-MS interface enables serving network 250 to perform various control functions before location determination takes place.

Location disclosure may utilize the following interfaces. A location server-location client interface is used to send location information from a location server to a location client for position disclosure. An LCS server-HAAA interface is used to send authentication and authorization information for location disclosure. H-AAA 218 may send subscriber profile to LCS server 216. LCS server 216 may also send accounting information to the H-AAA 218.

If mobile station 280 is located away from its home network 210 and is communicating with serving network 250, then location determination is performed via serving network 250 (with assistant from home network 210, if needed) and location disclosure is performed by home network 210 (with the location information obtained via serving network 250). If mobile station 280 is communicating with its home network 210, then location determination is performed by network entities (e.g., PDE, MPC) in home network 210, and location disclosure is also performed by home network 210.

Location services include (1) mobile-originated or mobile-initiated location services whereby the requester is located in mobile station 280 and (2) mobile-terminated or network-initiated location services whereby the requester is located in network 210, 250, or 290. Table 1 shows where the location client and location server may be located for mobile-originated and mobile-terminated location services. Location services are originated by a location client, which may be located in mobile station 280 or LCS provider 202a, 202b, or 202c.

TABLE 1

|  | Mobile-Originated | Mobile-Terminated |
| --- | --- | --- |
| LCS Client | Mobile Station 280 | LCS Provider 202 |
| LCS Server | Mobile Station 280 or LCS server 216 | Mobile Station 280 or LCS server 216 |

A mobile-originated LCS request can result from an application that is located on mobile station 280 or from an application that is located in network 210, 250, or 290. Mobile station 280 performs the appropriate controls (by itself or under the direction of the network) to deliver the location information to the requester. Some examples of mobile-originated LCS requests include:

Request for location information for mobile station 280—the location client is located in mobile station 280;

Autonomous request for assistance data—mobile station 280 requests assistance data outside the context of location determination (the LCS request for assistance data is thus not tied to any specific location client); and Request for disclosure of location information to a third party—location information is sent to a third party location client (LCS provider 202c) that is designated by mobile station 280.

A mobile-terminated LCS request can result from an application that is located in network 210, 250, or 290. LCS server 216 performs the appropriate controls (e.g., authentication, service validation and authorization, encryption, and so on). Mobile-terminated LCS requests include request for location information for mobile station 280, whereby the location server is located in mobile station 280.

Since location determination and location disclosure are treated as separate processes, different call flows may be defined and used for these two processes. A call flow is a sequence of steps that can be performed to achieve a given result. Each step in a call flow may invoke a particular procedure. Exemplary call flows are described below for (1) discovery of the IP address of SMPC 256 (for a roaming mobile station), (2) authentication, authorization, and session key setup, (3) mobile-originated location determination and location disclosure, (4) mobile-terminated location determination and location disclosure, and (5) other LCS related functions.

1. SMPC Discovery

An SMPC discovery scheme is provided herein to allow a mobile station to dynamically determine the address of an SMPC for location determination. This scheme supports roaming for the mobile station since the SMPC address does not need to be pre-configured on the mobile station.

FIG. 3A shows an exemplary call flow 300 for mobile station 280 to obtain the IP address of SMPC 256. Mobile station 280 initiates a data call to set up a PPP (Point-to-Point Protocol) session with PDSN 270 (step 312). During an IPCP (IP Control Protocol) phase of the data call, mobile station 280 receives the IP address of DNS server 262.

Mobile station 280 then sends a DNS query for SMPC 256 using a fully qualified domain name (FQDN) (step 314). A FQDN is a domain name that extends all the way back to the root of the tree. As some examples, the FQDN used for position determination may be "pde.gpsone.<SID>.net.", "<NID>.<SID>.mpc.net.", "mpcgpsone.net.", or "<SID>.mpcgpsone.net.", where "<NID> is a network identifier and <SID> is a system identifier. The FQDN may be pre-configured on mobile station 280 or sent to mobile station 280 via over-the-air signaling. The FQDN for position determination may also be standardized across the wireless communication networks to enable roaming. DNS server 262 maps the FQDN into the IP address of SMPC 256 and sends to mobile station 280 a DNS response with this IP address (step 316).

A mobile station may be roaming and may be in communication with a visited network, and the LCS server may be located in the home network, as shown in FIG. 2. In this case, the LCS server may need to know the IP address of the SMPC. For example, the location information for the roaming mobile station may be cached in the SMPC, and the IP address of the SMPC would be needed to obtain this location information. An SMPC discovery scheme is provided herein to allow the LCS server to dynamically determine the address of the SMPC for location disclosure.

FIG. 3B shows an exemplary call flow 350 for LCS server 216 to obtain the IP address of SMPC 256. Mobile station 280 initiates a data call to set up a PPP session with PDSN 270 (step 362). During the setup of the data call, PDSN 270 sends to H-AAA 218 an Access Request message with both the ID of mobile station 280 (MS ID) and the IP address of SMPC 256 (step 364). The IP address of SMPC 256 may be pre-configured in PDSN 270 in accordance with the topology of serving network 250. It should be noted that one SMPC 256 may serve multiple PDSNs 270. H-AAA 218 receives the Access Request message from PDSN 270 and acknowledges it by returning an Access Accept message (step 366). H-AAA 218 then sends the ID of mobile station 280 and the IP address of SMPC 256 to LCS server 216 (step 368). LCS server 216 returns an acknowledgment to H-AAA 218 (step 370).

2. Authentication, Authorization, and Session Key Setup

As noted above, location determination and location disclosure are treated as separate processes by LCS architecture 100. Different authentication, authorization, and session key setup procedures may then be used for these two processes to provide various benefits, as described below.

A. Location Determination

For location determination, for both mobile-originated and mobile-terminated location services, SMPC 256 may perform authentication and authorization based on the identity of the requestor. These procedures may be performed, for example, (1) if SPDE 260 is needed to assist with location determination, (2) if a session key used for location determination (which is referred to as "Session Key 1") is needed, (3) if the lifetime of the current Session Key 1 has expired, and so on. The Session Key 1 lifetime indicates the time period in which the Session Key 1 is valid. Upon successfully authenticating mobile station 280, H-AAA 218 may send security information to SMPC 256, which may then forward the security information to mobile station 280. The security information may include, for example, a new Session Key 1, the lifetime of the Session Key 1, and so on. The Session Key 1 may then be used between mobile station 280 and SMPC 256 or between mobile station 280 and SPDE 260 for location determination. The Session Key 1 may be used to authenticate messages and/or to encrypt them.

Figure 4A:
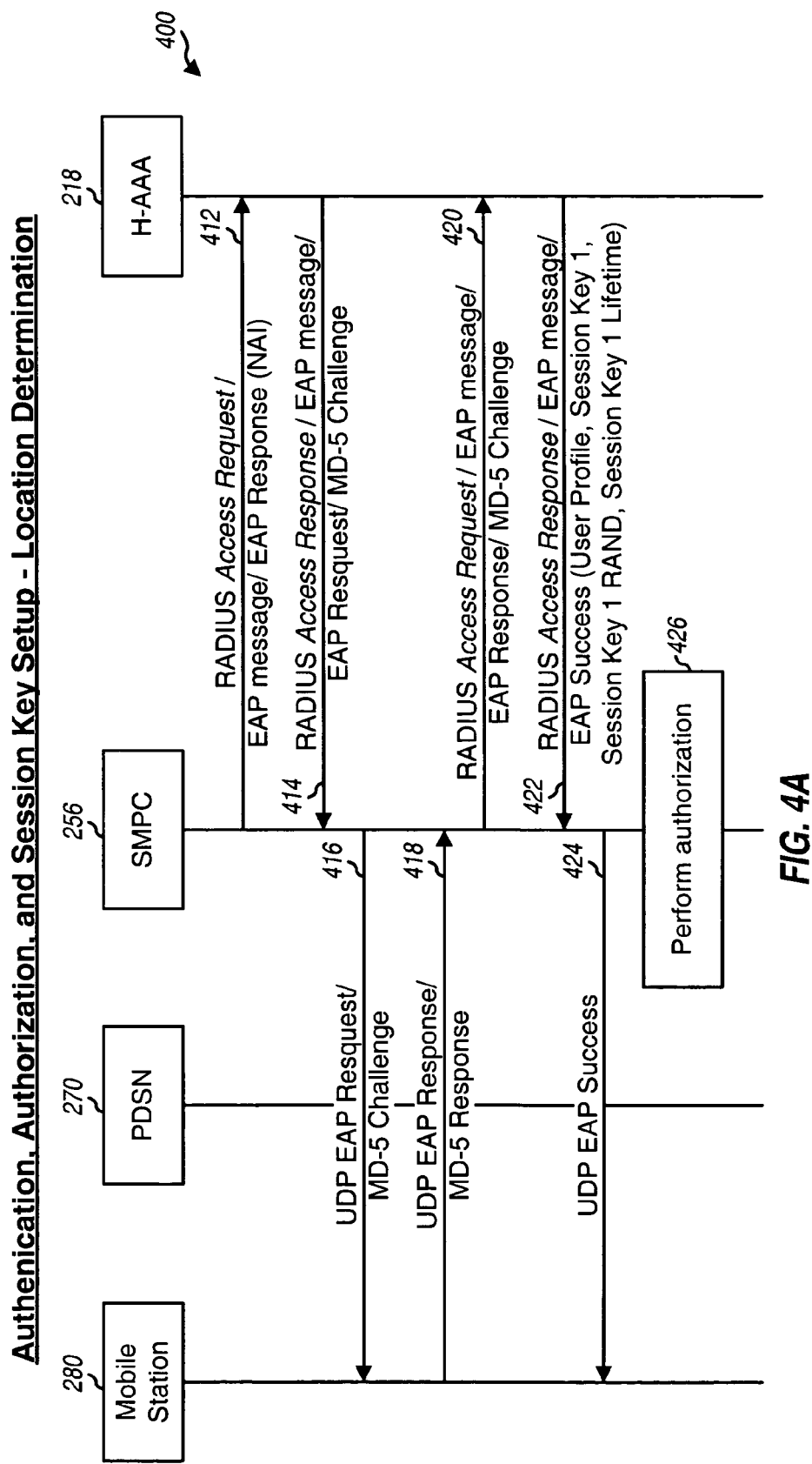
FIGS. 4A and 4B show call flows for authentication, authorization, and session key setup for location determination and location disclosure, respectively.

FIG. 4A shows an exemplary call flow 400 for authentication, authorization, and session key setup for location determination. Call flow 400 uses an MD-5 Message-Digest algorithm for only authenticating mobile station 280 to the network. The MD-5 algorithm is well known in the art and described by R. Rivest in a document RFC 1321, entitled "The MD5 Message-Digest Algorithm," which is publicly available. The messaging between SMPC 256 and H-AAA 218 is via EAP (Extensible Authentication Protocol) over UDP, and the messaging between SMPC 256 and mobile station 280 is via UDP. EAP over UDP is described by P. Engelstad in a document entitled "EAP over UDP (EAPoUDP)," which is publicly available.

Mutual authentication may also be performed to authenticate both mobile station 280 to the network and the network to mobile station 280. If mutual authentication is required, then an Authentication and Key Agreement (AKA) procedure or some other mechanisms may be used instead of the MD-5 procedure. The AKA procedures for W-CDMA is described in a document 3GPP TS 33.102 entitled "3G Security; Security Architecture," which is publicly available.

For call flow 400, SMPC 256 initially sends to H-AAA 218 a RADIUS Access Request packet (step 412). RADIUS (Remote Authentication Dial-In User Service) is a security system that uses a client-server approach to authenticate remote users via a series of challenges and responses that a client (SMPC 256) relays between a server (H-AAA 218) and a user (mobile station 280). The RADIUS Access Request packet contains an EAP message that further contains an EAP Response field. The EAP Response field contains a Network Access Identifier (NAI) for mobile station 280. Prior to performing call flow 400, mobile station 280 establishes a PPP session (not shown in FIG. 4A). The NAI is a user ID (e.g., "username@domain-name.com") submitted by mobile station 280 (acting as a client) during PPP authentication.

H-AAA 218 receives the RADIUS Access Request packet from SMPC 256 and responds by sending back a RADIUS Access Challenge packet. The RADIUS Access Challenge packet contains an EAP message that further contains an EAP Request field for an MD-5 Challenge (step 414). The MD-5 Challenge is an authentication challenge generated by H-AAA 218 based on the NM received from SMPC 256. SMPC 256 forwards the EAP Request with the MD-5 Challenge (over UDP) to mobile station 280 (step 416). Mobile station 280 receives the EAP Request from SMPC 256 and determines a response to the authentication challenge. Mobile station 280 then responds by sending an EAP Response with an MD-5 Response (over UDP) to SMPC 256 (step 418).

SMPC 256 then resubmits to H-AAA 218 its original RADIUS Access Request packet, which contains the MD-5 Response provided by mobile station 280 (step 420). H-AAA 218 authenticates mobile station 280 based on the MD-5 Response. Upon successfully authenticating mobile station 280, H-AAA 218 sends back a RADIUS Access Response packet (step 422). This packet contains an EAP message that further contains an EAP Success field. The EAP Success field contains the user profile for mobile station 280, which is obtained from database 222. H-AAA 218 may also return security information. The security information may include, for example, a new Session Key 1, a Session Key 1 random number (RAND), and the Session Key 1 lifetime. SMPC 256 then sends the EAP Success (over UDP) to mobile station 280 (step 424). SMPC 256 also authorizes mobile station 280 by checking the user profile received from H-AAA 218 (step 426).

B. Location Disclosure

For location disclosure, for both mobile-originated and mobile-terminated location services, the location server may be located in the home network (i.e., in LCS server 216). In this case, LCS server 216 may perform authentication and authorization procedures based on the identity of the requester. These procedures may be performed, for example, (1) if a session key used for location disclosure (which is referred to herein as "Session Key 2") is needed, (2) if the lifetime of the current Session Key 2 has expired, and so on. Either one-way authentication (e.g., authenticating mobile station 280 via an MD-5 challenge as shown in FIG. 4A) or mutual authentication (e.g., using AKA or other mechanisms) may be performed.

Figure 4B:
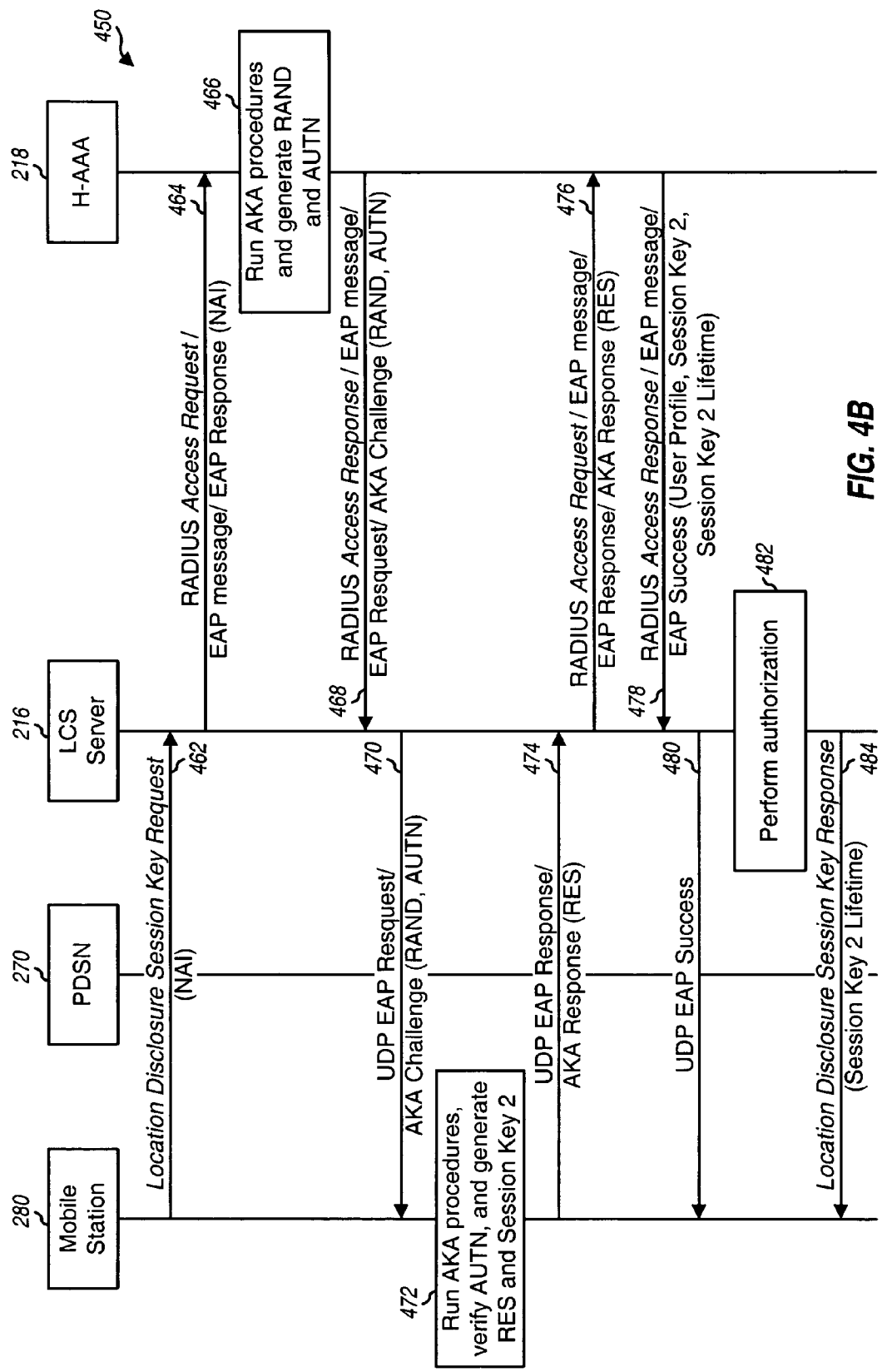

FIG. 4B shows an exemplary call flow 450 for authentication, authorization, and session key setup for location disclosure. Call flow 450 uses the AKA procedure for authenticating mobile station 280.

For call flow 450, mobile station 280 initially sends a Location Disclosure Session Key Request message to LCS server 216 (step 462). This message requests a new Session Key 2 for location disclosure and includes the NM for mobile station 280. LCS server 216 then sends to H-AAA 218 a RADIUS Access Request packet (step 464). This packet contains an EAP message that further contains an EAP Response field with the NAI. H-AAA 218 runs the AKA procedures and generates a random number (RAND) and an authentication value (AUTN) (step 466). H-AAA 218 then responds by sending back a RADIUS Access Response packet (step 468). This packet contains an EAP message that further contains an EAP Request field. The EAP Request field carries an AKA Challenge that includes the AUTN and RAND generated by H-AAA 218. LCS server 216 receives the RADIUS Access Response packet from H-AAA 218 and forwards the EAP Request with the AKA Challenge (over UDP) to mobile station 280 (step 470).

Mobile station 280 receives the EAP Request from LCS server 216, runs the AKA procedures, and verifies the received AUTN. If the received AUTN is checked, then mobile station 280 generates a new. Session Key 2 and a RES based on the received RAND (step 472). Mobile station 280 then responds by sending to LCS server 216 an EAP Response with an AKA Response that includes the RES (step 474).

LCS server 216 then resubmits to H-AAA 218 its original RADIUS Access Request packet (step 476). This packet contains the AKA Response with the RES provided by mobile station 280. H-AAA 218 authenticates mobile station 280 based on the AKA Response. Upon successfully authenticating mobile station 280 by checking the RES, H-AAA 218 sends a RADIUS. Access. Response packet to LCS server 216 (step 478). This packet contains an EAP message that further contains an EAP Success field. The EAP Success field contains the user profile for mobile station 280, which is obtained from database 222. H-AAA 218 also return security information. The security information may include, for example, the Session Key 2, Session Key 2 RAND, and Session Key 2 lifetime.

LCS server 216 receives the RADIUS Access Response packet from H-AAA 218 and may retain the user profile and the Session Key 2 for its own use. LCS server 216 then sends the EAP Success (over UDP) to mobile station 280 (step 480). LCS server 216 next authorizes mobile station 280 by checking the user profile (step 482). LCS server 216 then sends to mobile station 280 a Location Disclosure Session. Key Response message that includes the Session Key 2 lifetime (step 484).

As shown in FIG. 4B, upon successfully authenticating mobile station 280, H-AAA 218 may send security information (e.g., Session Key 2, Session Key 2 lifetime) to LCS server 216, which may then send the security information to mobile station 280. The Session Key 2 may be used between mobile station 280 and LCS server 216 for position disclosure. The Session Key 2 may be obtained for the following events:

When mobile station 280 subscribes service to LCS server 216;
When mobile station 280 or LCS server 216 detects that the Session Key 2 lifetime has expired; or
When mobile station 280 (acting as a location client) requests location information from LCS server 216.

Call flow 400 shows the use of the MD-5 algorithm for location determination, and call flow 450 shows the use of the AKA procedures for location disclosure. Other security algorithms may also be used for location determination and location disclosure, and this, is within.the scope of the invention. For example; a CAVE (Cellular Authentication and Voice Encryption) algorithm may be used for access authentication. A CHAP (Challenge Handshake Authentication Protocol) and a Mobile IP Protocol may be used for IP authentication. The CAVE, CHAP, and Mobile IP algorithms are well known in the art.

C. Security and Privacy

Authentication and Authorization

Authentication and authorization may be performed independently for location determination and location disclosure, as described above. Authentication and authorization for location determination may be performed, for example, using call flow 400 in FIG. 4A. Authentication and authorization for location disclosure may be performed, for example, using call flow 450 in FIG. 4B.

Encryption.

Location information may be sent as user traffic and encrypted using Link Layer Encryption, as described in a document IS-2000.5-C, entitled "Upper layer (Layer3) Signaling Standard for cdma2000 Spread Spectrum Systems," which is publicly available. Location information may also be encrypted using a session key (obtained by performing the procedures in call flow 400 or 450) and sent using end-to-end encryption. If end-to-end encryption is used, then H-AAA 218 can generate different session keys from a root key (e.g., an "A KEY" may be used as the root key). These different session keys may be provided to, and used by, different network entities for encryption of location information.

Separate session keys may be obtained and used for location determination and location disclosure. The use of separate session keys simplifies the LCS architecture and reduces security risks. Mobile station 280 maintains a security association with network entities (e.g., LCS server 216) in home network 210. The session key for this association (Session Key 2) is not disclosed to any network entity outside of home network 210. Exchanges of location information between LCS server 216 and mobile station 280 may be signed and/or encrypted using Session Key 2.

A roaming mobile station 280 may maintains another security association with network entities (e.g., SMPC 256 and SPDE 260) in serving network 250. A separate session key (Session Key 1) is established for the entities in serving network 250. Exchanges of location information between SPDE 260 and mobile station 280, or between SMPC 256 and mobile station 280, may be signed and/or encrypted using Session Key 1.

The session keys may also be used for message authentication and integrity checks. The use of the session keys for message authentication/encryption and the lifetime of each session key may be determined by operational parameters. These parameters may take into account data-specific policies. This allows the degree of security protection to be selected or adjusted based on the value of the information to be protected.

3. Mobile-Originated Location Services

For mobile-originated location services, the location client is located in mobile station 280 and the location server may be located in mobile station 280 or LCS server 216 (see Table 1). If the location server is located in mobile station 280, then the location client requests location information from mobile station 280.

A. Location Determination

IS-801 supports a number of methods for location determination. A satellite positioning system (SPS) based method can provide an accurate location estimate for a mobile station based on signals received from a sufficient number of SPS satellites (typically four). A hybrid method can provide a location estimate, with intermediate accuracy, for a mobile station based on signals received from a sufficient number of SPS satellites and base stations. An Advanced Forward Link Trilateration (A-FLT) method can provide a location estimate, with reduced accuracy, for a mobile station based on signals received from a sufficient number of base stations (typically three or more).

Figure 5A:
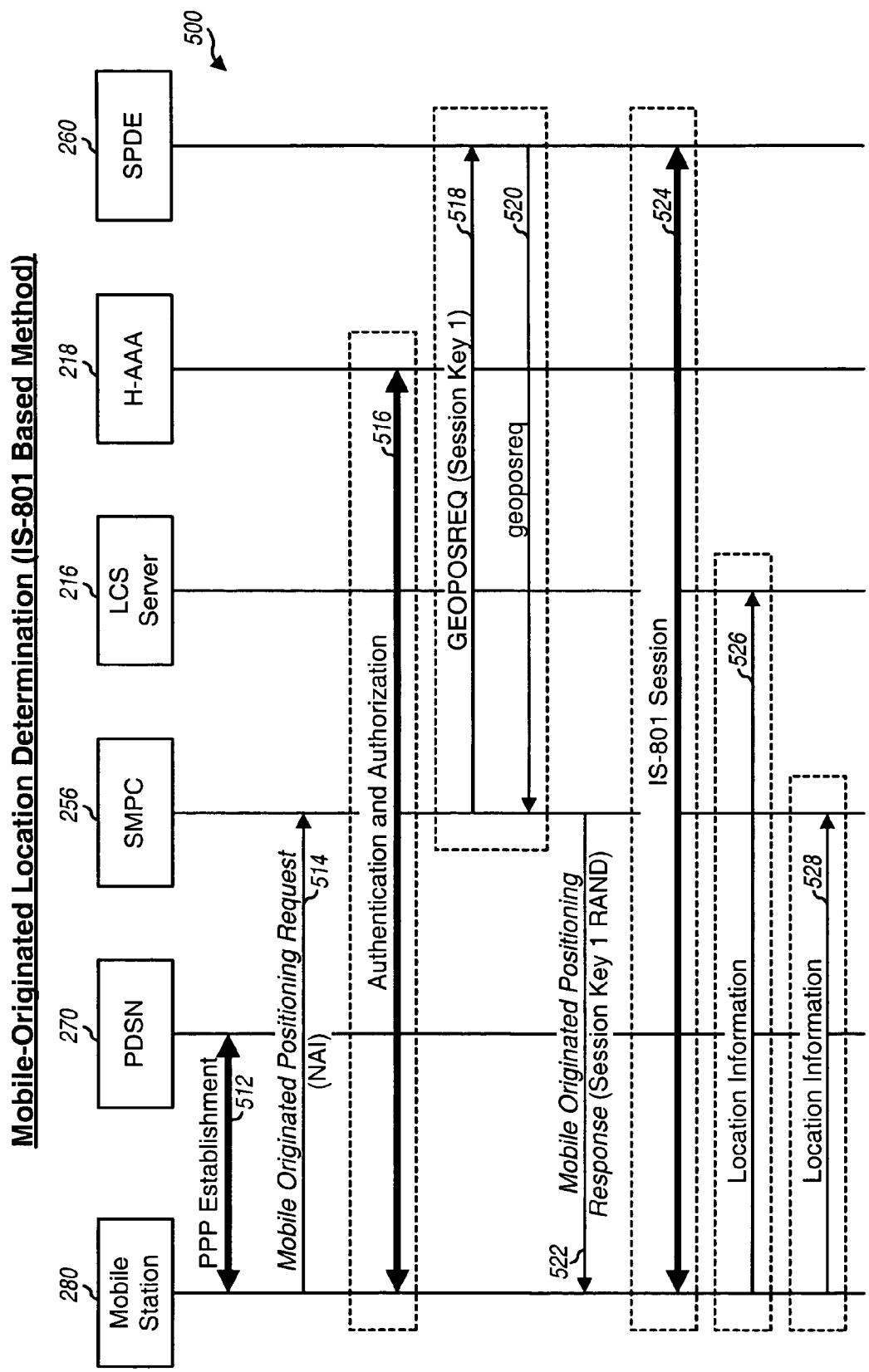
FIGS. 5A and 5B show call flows for performing mobile-originated location determination with an IS-801 based method and a cell-ID method, respectively.

FIG. 5A shows an exemplary call flow 500 for performing mobile-originated location determination with an IS-801 based method. Mobile station 280 initiates a data call to set up a PPP session with PDSN 270 (step 512). Mobile station 280 then sends to SMPC 256 a Mobile Originated Positioning Request message that includes the NAI for mobile station 280 (step 514). SMPC 256 receives this message and determines whether or not authentication and authorization need to be performed for mobile station 280. Authentication and authorization do not need to be performed, for example, if authentication and authorization procedures have previously been performed for mobile station 280 and the Session Key 1 obtained via these procedures is still valid because the Session Key 1 lifetime has not expired. Authentication and authorization may need to be performed, for example, if the authentication and authorization procedures have not been performed previously for mobile station 280 or if the Session Key 1 lifetime has expired.

If authentication and authorization does not need to be performed, then steps 516, 518, and 520 are skipped. Otherwise, call flow 400 in FIG. 4A is performed and SMPC 256 may or may not receive a new Session Key 1, a new Session Key 1 RAND, and a new Session Key 1 lifetime from H-AAA 218 (step 516). If SMPC 256 does not receive a new Session Key 1 from H-AAA 218 from performing step 516, then steps 518 and 520 are skipped. If SMPC 256 receives a new Session Key 1 from H-AAA 218 from .performing step 516, then SMPC 256 sends to SPDE 260 a GEOPOSREQ message that includes this Session Key 1 (step 518). SPDE 260 then responds by sending a geoposreq message back to SMPC 256 (step 520). The GEOPOSREQ and geoposreq messages are described in TIA/EIA/PN-4747. Step 516 may or may not be performed for call flow 500, and this is indicated by a dashed box around step 516. Steps 518 and 520 may or may not be performed, and this is also indicated by a dashed box around steps 518 and 520.

In any case, SMPC 256 sends a Mobile Originated Positioning Response message to mobile station 280 (step 522). This message includes the current Session Key 1 RAND, which is either (1) the new Session Key 1 RAND received from H-AAA 218, if this RAND is obtained as a result of performing the authentication and authorization procedures in step 516, or (2) a Session Key 1 RAND obtained from previously performing the authentication and authorization procedures. Mobile station 280 uses the Session Key 1 RAND from SMPC 256 to derive the Session Key 1, which may then be used to sign and/or encrypt messages.

An IS-801 location determination session is then established between mobile station 280 and SPDE 260 to determine the location of mobile station 280 (step 524). All IS-801 messages for this IS-801 session may be authenticated and/or encrypted with the Session Key 1. Mobile station 280 obtains location information upon completion of the IS-801 session. This location information may include a location estimate for mobile station 280, an accuracy or uncertainty for the location estimate, and so on. If location determination is performed by SPDE 260 with the assistance of mobile station 280, then SPDE 260 may send location information to mobile station 280.

Upon successfully finishing the IS-801 session, the location information may be cached (i.e., stored in a memory unit) in mobile station 280, LCS server 216, and/or SMPC 256 for future use. If the location information is to be cached in LCS server 216, then mobile station 280 sends the location information (which may be authenticated and/or encrypted with the Session Key 2) to LCS server 216 (step 526). If the location information is to be cached in SMPC 256, then mobile station 280 sends the location information (which may be authenticated and/or encrypted with the Session Key 1) to SMPC 256 (step 528). Each of steps 526 and 528 may or may not be performed, and this is indicated by a dashed box around each of these steps.

Figure 5B:
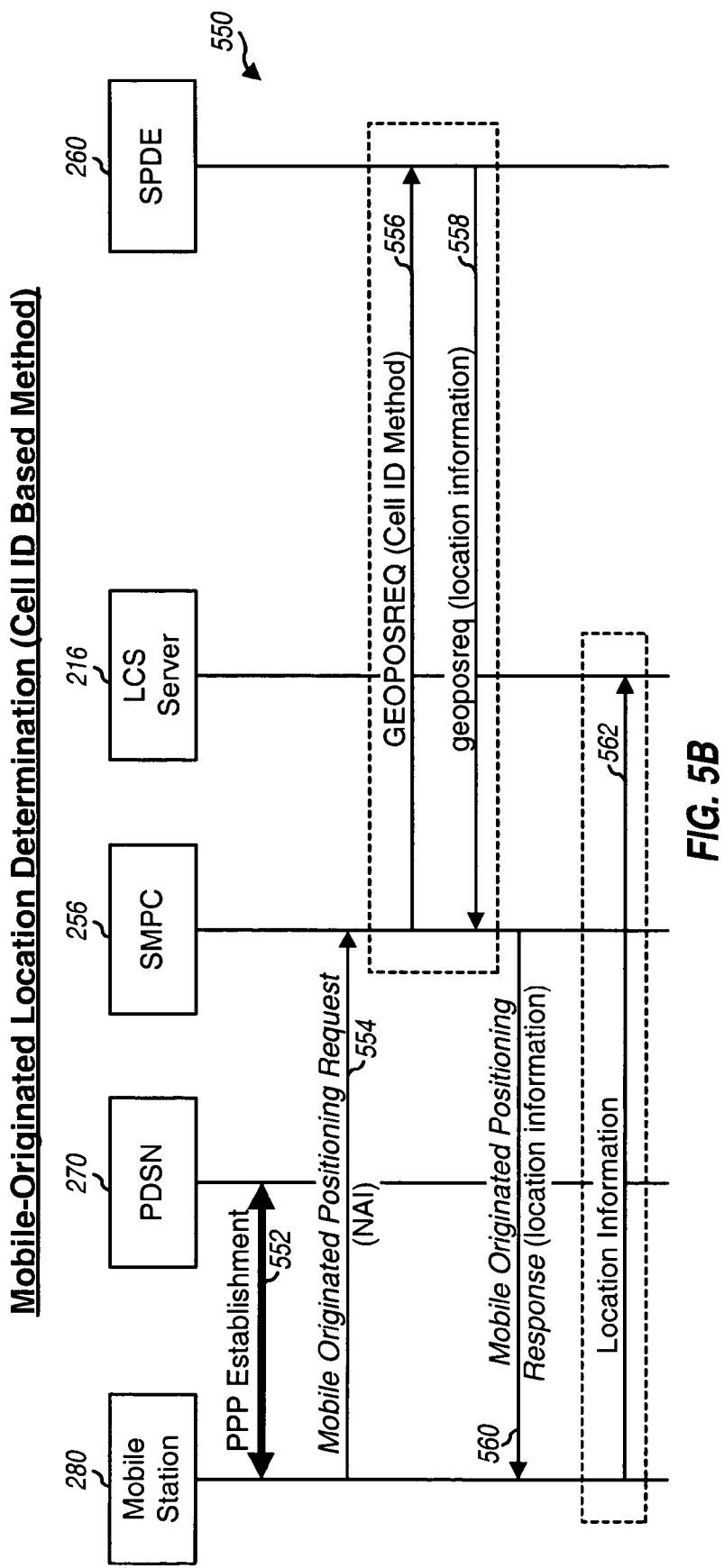

FIG. 5B shows an exemplary call flow 550 for performing mobile-originated location determination with a cell-ID method. The cell-ID method provides the identity of a serving cell with which mobile station 280 currently communicates. For the cell-ID method, mobile station 280 is deemed to be located at a designated location that is associated with the serving cell. The designated location may be, for example, the location of the antenna for the serving cell, the location of the base station for the serving cell, or some other location within the coverage area of the serving cell. The accuracy of the location estimate for mobile station 280 is dependent on the size of the serving cell.

For call flow 550, mobile. station 280 initiates a data call to set up a PPP session with PDSN 270 (step 552). Mobile station 280 then sends to SMPC 256 a Mobile Originated Positioning Request message that includes the NM for mobile station 280 (step 554). SMPC 256 next determines the ID of the serving cell with which mobile station 280 currently communicates. SMPC 256 then sends to SPDE 260 a GEOPOSREQ message with an indication that the cell-ID method is being used (step 556). SPDE 260 receives this message from SMPC 256 and sends back a geoposreq message that includes location information for mobile station 280. This location information may include a location estimate for the mobile station (based on the serving cell ID), the location accuracy or uncertainty, and so on.

SMPC 256 then sends to mobile station 280 a Mobile Originated Positioning Response message that includes the location information for mobile station 280 (step 560). LCS server 216, SMPC 256, and/or mobile station 280 may cache the location information for future use. If the location information is to be cached in LCS server 216, then mobile station 280 sends the location information (which may be authenticated and/or encrypted with the Session Key 2) to LCS server 216 (step 562).

B. Location Disclosure

Once the location information for mobile station 280 has been obtained by performing location determination, this information may be cached for future use. The location information may be cached in mobile station 280, SMPC 256, and/or LCS server 216. Where to cache the location information may be determined based on various factors such as, for example, the service provider's policy, the user's subscription, and so on.

For mobile-originated location disclosure, the location client is located in mobile station 280, and the location server may be located in mobile station 280 or LCS server 216. Table 2 lists various call flows that may be used to provide location information for mobile-originated location disclosure. The specific call flow to use for location disclosure is dependent on where the location client is located and where the location information is cached.

TABLE 2

Mobile-Originated Location Disclosure

Figure 6C:
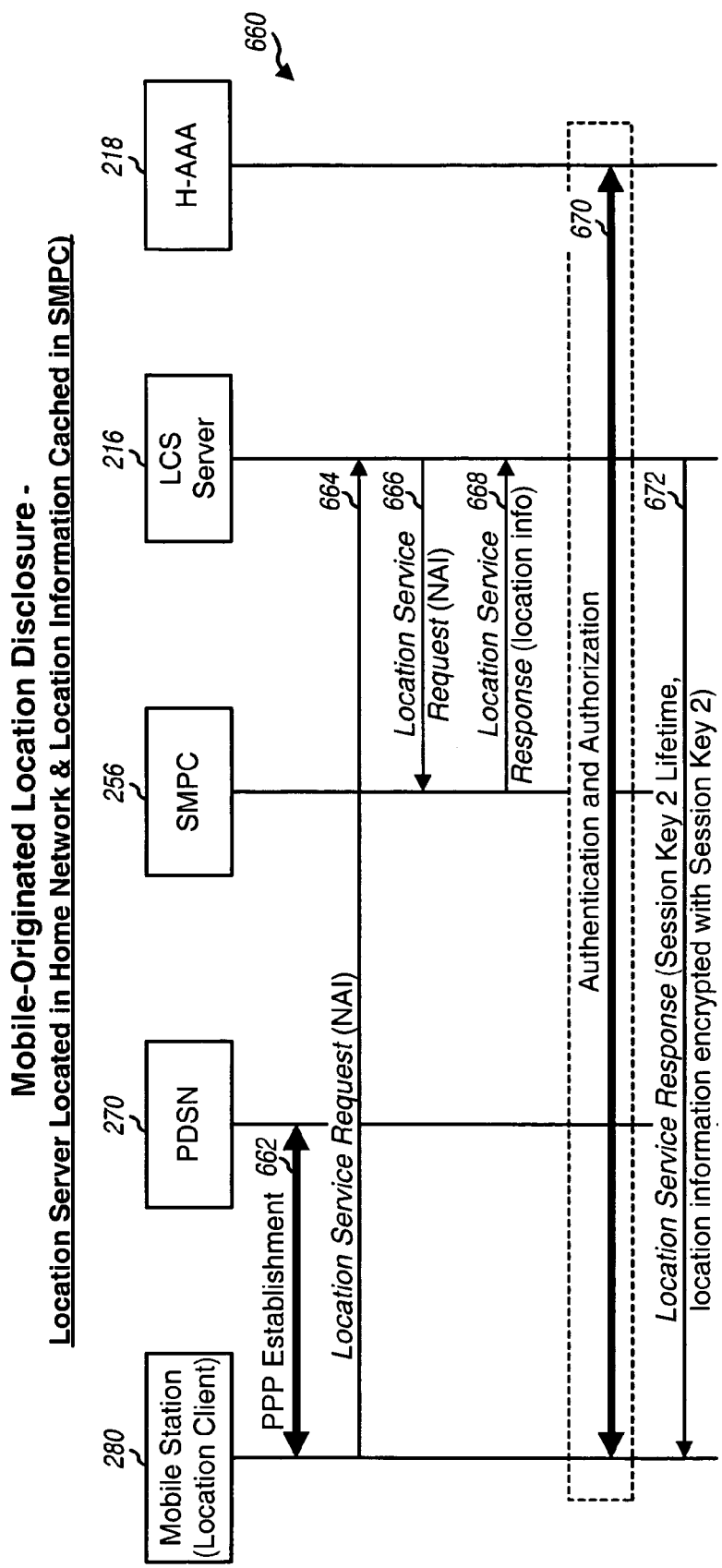

| Where LCS Client is Located | Where LCS Server is Located | Where Location Information is Cached | Location Disclosure Method |
| --- | --- | --- | --- |
| Mobile Station | Mobile Station | Mobile Station | Provide location information directly |
| Mobile Station | Mobile Station | SMPC 256 | Use call flow 600 in FIG. 6A |
| Mobile Station | LCS Server 216 | LCS Server 216 | Use call flow 630 in FIG. 6B |
| Mobile Station | LCS Server 216 | SMPC 256 | Use call flow 660 in FIG. 6C |

If the location server is located in mobile station 280 and the location information is also cached in mobile station 280, then the location server can obtain the location information from memory and provide it directly to the location client.

FIG. 6A shows an exemplary call flow 600 for performing location disclosure whereby the location server is located in mobile station 280 and the location information is cached in SMPC 256. Mobile station 280 initiates a data call to set up a PPP session with PDSN 270 (step 612). Mobile station 280 (acting as the location client) then sends to SMPC 256 a Location Service Request message that includes the NAI for mobile station 280 (step 614). SMPC 256 receives this message and determines whether or not authentication and authorization need to be performed for mobile station 280. If authentication and authorization need to be performed, then call flow 400 in FIG. 4A is performed to obtain a new Session Key 1 and a new Session Key 1 RAND (step 616). Otherwise, step 616 is skipped. Step 616 may or may not be performed for call flow 600, and this is indicated by a dashed box around step 616. Call flow 400 (instead of call flow 450) is used for authentication, authorization, and session key setup because SMPC 256 is located in serving network 250.

SMPC 256 then sends to mobile station 280 a Location Service Response message that includes the location information that has been cached for mobile station 280 (step 618). If step 616 was performed, then SMPC 256 may include the new Session Key 1 RAND in this Location Service Response message and may also sign and/or encrypt the location information with the new Session Key 1 obtained from step 616. If step 616 was not performed, then SMPC 256 may sign and/or encrypt the location information with a Session Key 1 obtained from prior authentication and authorization procedures, if the lifetime of this Session Key 1 has not expired. For call flow 600, SMPC 256 effectively performs the function of the location server.

FIG. 6B shows an exemplary call flow 630 for performing location disclosure whereby the location server is located in LCS server 216 and the location information is also cached in LCS server 216. Mobile station 280 initiates a data call to set up a PPP session with PDSN 270 (step 632). Mobile station 280 (acting as the location client) then sends to LCS server 216 a Location Service Request message that includes the NAI for mobile station 280 (step 634). LCS server 216 receives this message and determines whether or not authentication and authorization need to be performed for mobile station 280. If authentication and authorization need to be performed, then call flow 450 in FIG. 4B is performed and a new Session Key 2 and a new Session Key 2 lifetime are obtained (step 636). Otherwise, step 636 is skipped. Step 636 may or may not be performed for call flow 630, and this is indicated by a dashed box around step 636.

LCS server 216 then sends to mobile station 280 a Location Service Response message that includes the location information that has been cached for mobile station 280 (step 638). If step 636 was performed, then LCS server 216 may also include the new Session Key 2 lifetime in this Location Service Response message and may sign and/or encrypt the location information with the new Session Key 2. If step 636 was not performed, then LCS server 216 may sign and/or encrypt the location information with a Session Key 2 obtained from prior authentication and authorization procedures, if the lifetime of this Session Key 2 has not expired.

FIG. 6C shows an exemplary call flow 660 for performing location disclosure whereby the location server is located in LCS server 216 and the location information is cached in SMPC 256. Mobile station 280 initiates a data call to set up a PPP session with PDSN 270 (step 662). Mobile station 280 (acting as the location client) then sends to LCS server 216 a Location Service Request message that includes the NAI for mobile station 280 (step 634). LCS server 216 receives this message and determines that it does not have location information, which satisfies the PQoS requirements, for mobile station 280. LCS server 216 then requests location information for mobile station 280 from SMPC 256. This is achieved by sending to SMPC 256 a Location Service Request message that includes the NAI (step 666). LCS server 216 can obtain the IP address of SMPC 256 by performing call flow 350 in FIG. 3B. SMPC 256 receives the request from LCS server 216 and sends back a Location Service Response message (step 668). This message includes the location information that has been cached in SMPC 256 for mobile station 280.

LCS server 216 then determines whether or not authentication and authorization need to be performed for mobile station 280. If authentication and authorization need to be performed, then call flow 450 in FIG. 4B is performed and a new Session Key 2 and a new Session Key 2 lifetime are obtained (step 670). Otherwise, step 670 is skipped. Step 670 may or may not be performed for call flow 660, and this is indicated by a dashed box around step 670.

LCS server 216 then sends to mobile station 280 a Location Service Response message that includes the location information for mobile station 280 (step 672). If step 670 was performed, then LCS server 216 may also include the new Session Key 2 lifetime in this Location Service Response message and may sign and/or encrypt the location information with the new Session Key 2. If step 670 was not performed, then LCS server 216 may sign and/or encrypt the location information with a Session Key 2 obtained from prior authentication and authorization procedures, if the lifetime of this Session Key 2 has not expired.

4. Mobile-Terminated Location Services

For mobile-terminated location services, the location client is located in an LCS provider and the location server may be located in mobile station 280 or LCS server 216 in home network 210 (see Table 1).

A mobile-terminated LCS session may be initiated by the network if mobile station 280 (which is the target mobile station) has established an "always-on" data session and is ready to receive location requests from LCS server 216. After mobile station 280 is power-on, it may initiate a data session. In this case, DNS server 262 may be updated with the IP address of mobile station 280. Mobile station 280 may register its IP address with LCS server 216 and may perform authentication and authorization procedures to obtain a session key for use to sign and/or encrypt messages. This data session is maintained as long as mobile station 280 is power-on. If LCS server 216 sends a DNS Query message for the IP address of mobile station 280, then DNS server 262 can quickly reply with a DNS Response message because DNS server 262 already has the IP address of mobile station 280.

Figure 7:
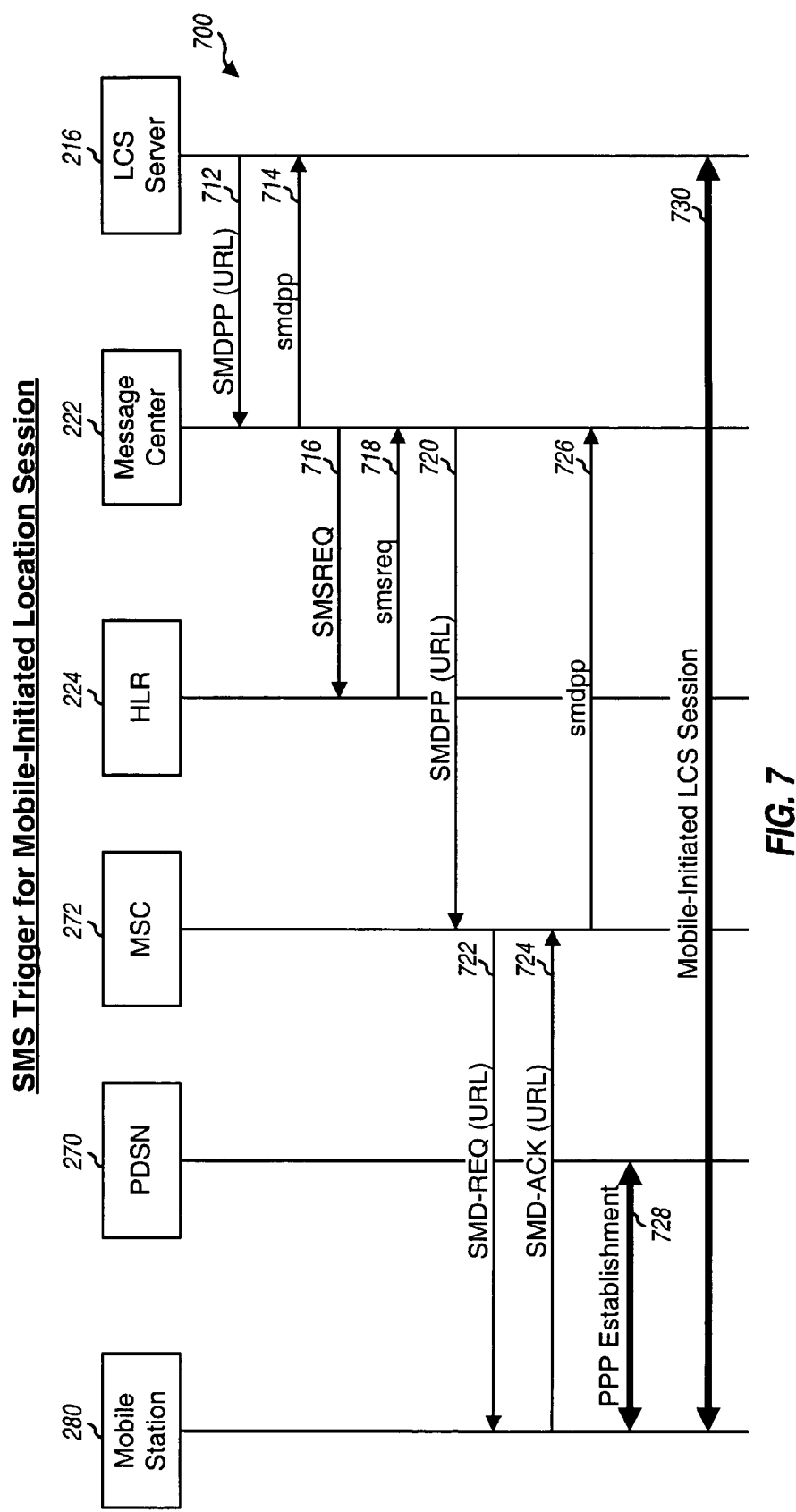

FIG. 7 shows an exemplary call flow 700 to set up the IP address of mobile station 280 if it is not always on. Call flow 700 uses SMS messaging to trigger mobile station 280 to start a mobile-originated LCS session. The IP address of mobile station 280 is then set up as part of the mobile-originated LCS session.

For call flow 700, LCS server 216 sends an SMS Delivery Point-to-Point Invoke (SMDPP) message to message center 222, which serves mobile station 280 (step 712). This SMDPP message includes a Push Notification and the IMSI of mobile station 280. The Push Notification is used to invoke mobile station 280 to initiate a data call so that its IP address may be set up. The IMSI (International Mobile Subscriber Identification) is a number that can uniquely identify mobile station 280. Upon sending the SMDPP message, LCS server 216 starts a timer, which is used to time-out the wait, for a reply for the SMDPP message. Message center 230 receives the SMDPP message from LCS server 216 and sends back an smdpp return result (step 714).

Message center 230 needs to know the SMS address of the current serving network for mobile station 280. The SMS address is used to send SMS messages to mobile station 280. Message center 230 then sends an SMS Request Invoke (SM- SREQ) message to HLR 224 (step 716). If HLR 224 has the SMS address of serving network 250 (which is the current serving network for mobile station 280), then HLR 224 replies with an smsreq message that contains this SMS address (step 718). Otherwise, HLR 224 forwards the SMSREQ message toward serving network 250 (not shown in FIG. 7).

Upon receiving the SMS addressnf serving network 250, message center 230 sends the SMDPP message to MSC 272 in serving network 250 (step 720). The SMDPP message is sent using the SMS address obtained from HLR 224 or serving network 250 in step 718. MSC 272 receives the SMDPP message from message center 230 and pages mobile station 280. MSC 272 also extracts the Push Notification from the received SMDPP message, includes the Push Notification in an SMS Delivery Request (SMD-REQ) message, and sends the SMD-REQ message over the air to mobile station 280 (step 722). Mobile station 280 receives the SMD-REQ message and replies with an SMS Delivery Acknowledge (SMD-ACK) message (step 724). MSC 272 receives the SMD-ACK message from mobile station 280 and returns an smdpp message to message center 230 (step 726).

The Push Notification triggers mobile station 280 to originate a data call, establish a PPP session with PDSN 270, and obtain an IP address (step 728). An IPCP or a Mobile IP procedure, which are known in the art, may be used to provide an IP address for mobile station 280. Mobile station 280 then starts a mobile-originated LCS session with LCS server 216 (step 730).

For mobile-terminated location services, LCS server 216 may discover the IP address of SMPC 256 using the procedures in call flow 350.

A. Location Determination

If location information is cached in mobile station 280 or LCS server 216, then there is no need for the network to initiate location determination because mobile station 280 will trigger a location determination session. If location information is allowed to be cached in SMPC 256, then a mobile-terminated LCS session may be initiated by SMPC 256.

Figure 8A:
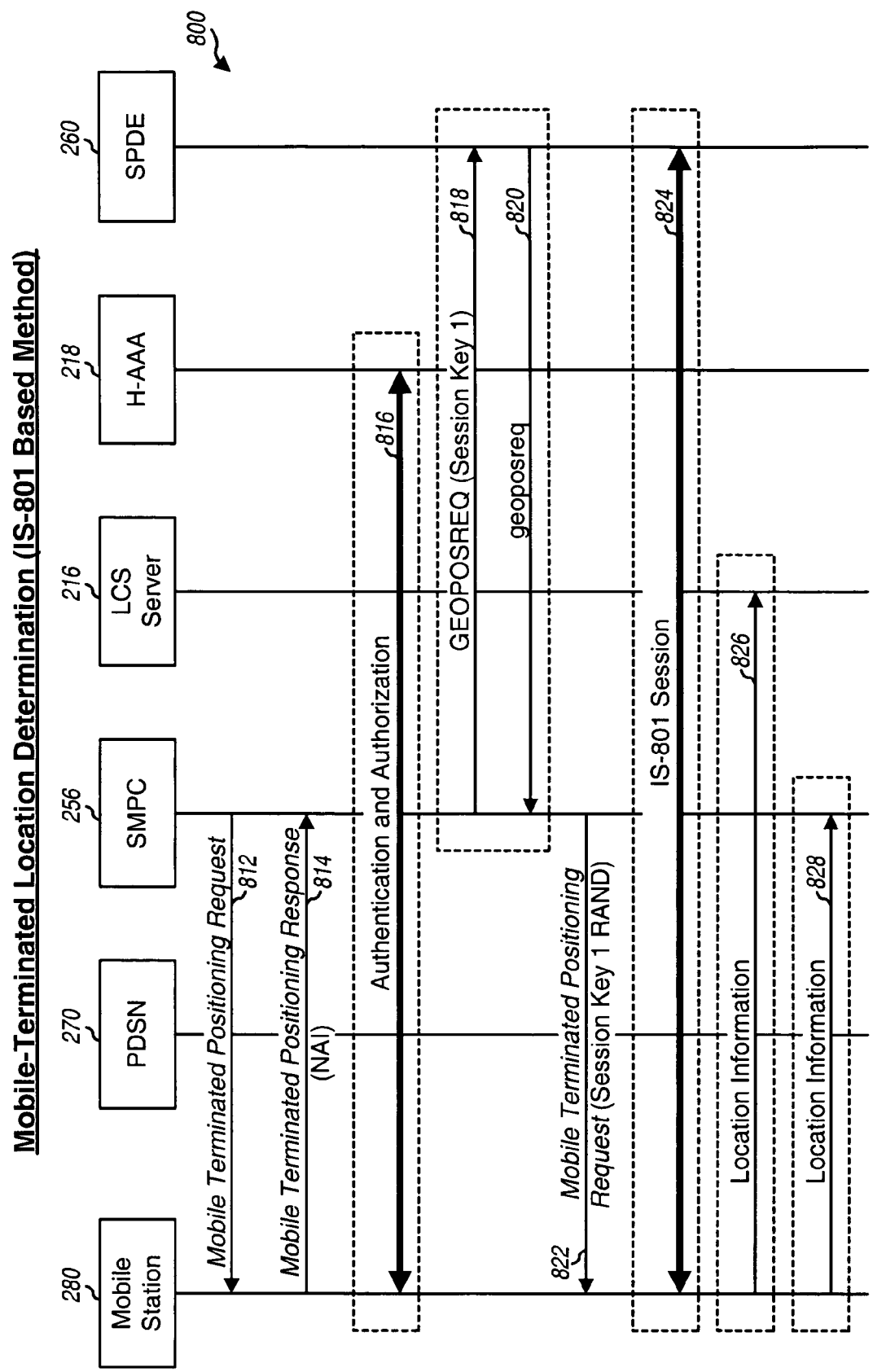
FIGS. 8A and 8B show call flows for performing mobile-terminated location determination with the IS-801 based method and the cell-ID method, respectively.

FIG. 8A shows an exemplary call flow 800 for performing mobile-terminated location determination with an IS-801 based method. SMPC 256 sends a Mobile Terminated Positioning Request message to mobile station 280 (step 812). Mobile station 280 receives this message from SMPC 256 and sends back a Mobile Terminated Positioning Response message that includes the NAI for mobile station 280 (step 814). The remaining steps 816 through 828 in call flow 800 are the same as steps 516 through 528 in call flow 500 in FIG. 5A, except that different messages are used. In particular, a Mobile Terminated Positioning Request message is used for step 822 whereas a Mobile Originated Positioning Response message is used for step 522.

Figure 8B:
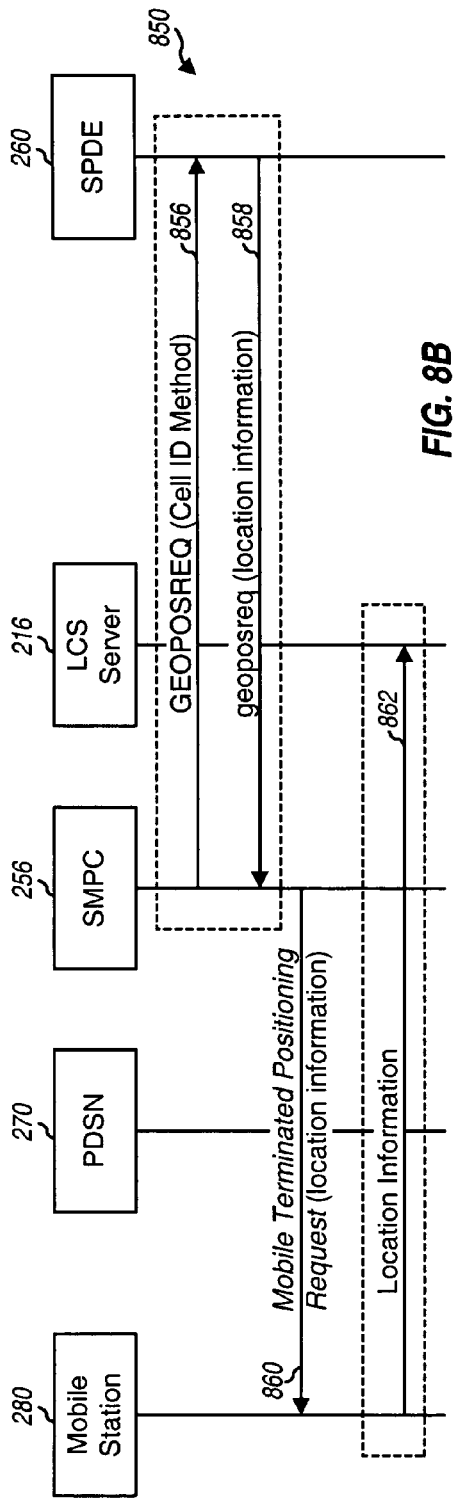

FIG. 8B shows an exemplary call flow 850, for performing mobile-terminated location determination with the cell-ID method. Call flow 850 includes steps 856, 858, 860, and 862, which correspond to steps 556, 558, 560, and 562, respectively, in call flow 550 in FIG. 5B. Steps 552 and 554 are omitted from call flow 850. Moreover, a Mobile Terminated Positioning Request message is used for step 860 whereas a Mobile Originated Positioning Response message is used for step 560

B. Location Disclosure

For mobile-terminated location disclosure, the location client is located in an LCS provider 202x, which may be LCS provider 202a in home network 210, LCS provider 202b in serving network 250, or LCS provider 202c in third party network 290 in FIG. 2. The location server may be located in mobile station 280 or LCS server 216 in home network 210. The location information may be cached in LCS server 216, SMPC 256, or mobile station 280. Table 3 lists various call flows that may be used to obtain location information for mobile-terminated location disclosure. The specific call flow to use for location disclosure is dependent on where the location server is located and where the location information is cached.

TABLE 3

Mobile-Terminated Location Disclosure

Figure 9A:
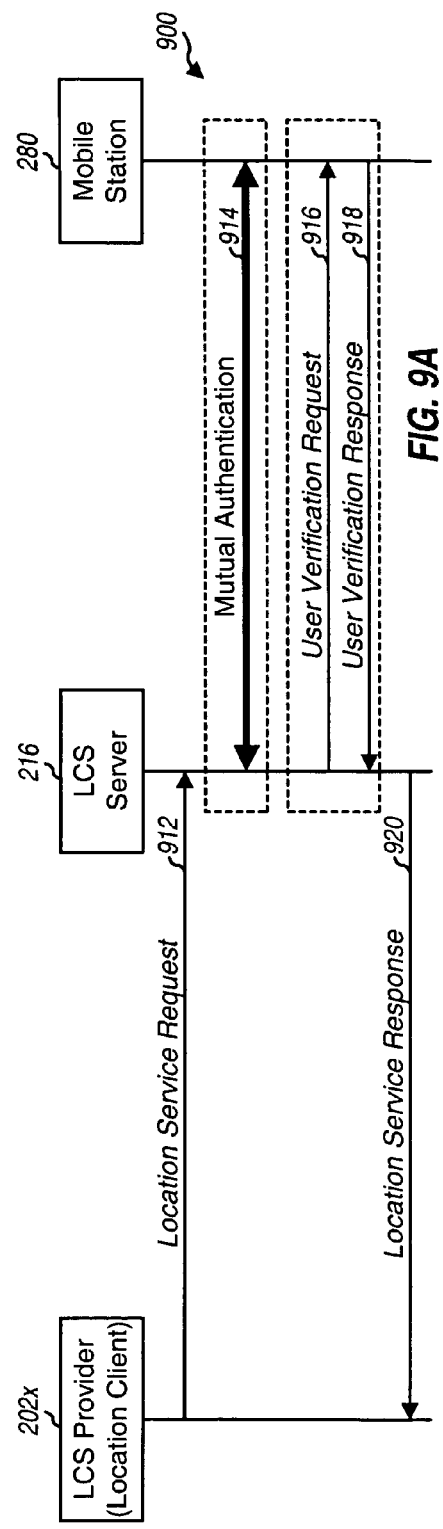

| Where LCS Client is Located | Where LCS Server is Located | Where Location Information is Cached | Location Disclosure Method |
| --- | --- | --- | --- |
| LCS Provider | Mobile Station | Mobile Station | Provide location information directly |
| LCS Provider | LCS Server 216 | LCS Server 216 | Use call flow 900 in FIG. 9A |
| LCS Provider | LCS Server 216 | SMPC 256 | Use call flow 930 in FIG. 9B |
| LCS Provider | LCS Server 216 | Mobile Station | Use call flow 960 in FIG. 9C |

If the location server is located in mobile station 280 and the location information is also cached in mobile station 280, then the location server can obtain the location information from memory and provide it directly to the location client.

FIG. 9A shows an exemplary call flow 900 for performing location disclosure whereby the location server is located in LCS server 216 and the location information is also cached in LCS server 216. LCS provider 202x (acting as a location client) sends to LCS server 216 a Location Service Request message (step 912). This message requests for location information for mobile station 280, which is the target mobile station. For call flow 900, it is assumed that the location information cached in LCS server 216 can satisfy the PQoS requirements. LCS server 216 may need to authenticate and authorize the location client (i.e., LCS provider 202x) via authentication and authorization procedures, which are not shown in FIG. 9A for simplicity.

The user profile for mobile station 280 may indicate that user verification is needed prior to each disclosure of the location information for mobile station 280. In this case, LCS server 216 and mobile station 280 perform mutual authentication using call flow 450 in FIG. 4B (step 914). LCS server 216 then sends a User Venfication Request message (which may be signed and/or, encrypted using the Session Key 2 obtained in step 914) to mobile station 280. Mobile station 280 responds by sending back a User Verification Response message (which may also be signed and/or encrypted using. the Session Key 2 obtained in step 914): This message indicates that disclosure of the location information for mobile station 280 is allowed. Since steps 914, 916, and 918 may or may not be performed for call flow 900, depending on the user profile, these steps are surrounded by dashed boxes. LCS server 216 then sends to LCS provider 202x a Location Service Response message that includes the location information for mobile station 280 (step 920).

FIG. 9B shows an exemplary call flow 930 for performing location disclosure whereby the location server is located in LCS server 216 and the location information is cached in SMPC 256. LCS provider 202x (acting as a location client) sends to LCS server 216 a Location Service Request message for location information for mobile station 280 (step 932). LCS server 216 may need to authenticate and authorize the location client, which is not shown in FIG. 9B for simplicity. Steps 934, 936, and 938 may then be performed if the user profile for mobile station 280 indicates that user verification is needed prior to each disclosure of the location information for mobile station 280. Steps 934, 936, and 938 correspond to steps 914, 916, and 918, respectively, in FIG. 9A.

The location information for mobile station 280 may be cached in LCS server 216. However, it is assumed that is this location information does not satisfy the PQoS requirements. LCS server 216 may then decide to obtain the location information for mobile station 280 from SMPC 256. This is achieved by sending a Location Service Request message to SMPC 256 (step 940). If SMPC 256 has the requested location information for mobile station 280, then it returns this location information to LCS server 216 in a Location Service Response message (step 942). Otherwise, SMPC 256 initiates a location determination session (using call flow 800 in FIG. 8A or call flow 850 in FIG. 8B) to obtain the location information, which is then sent back to LCS server 216. LCS server 216 then sends to LCS provider 202x a Location Service Response message that includes the location information for mobile station 280 (step 944).

FIG. 9C shows an exemplary call flow 960 for performing location disclosure whereby the location server is located in LCS server 216 and the location information is cached in mobile station 280 (which is the target mobile station). LCS provider 202x (acting as a location client) sends to LCS server 216 a Location Service Request message for location information for mobile station 280 (step 962). LCS server 216 may need to authenticate and authorize the location client, which is not shown in FIG. 9C for simplicity. The location information for mobile station 280 may be cached in LCS server 216. However, it is assumed that is this location information does not satisfy the PQoS requirements. LCS server 216 may then decide to obtain the location information from mobile station 280.

If the user profile for mobile station 280 indicates that user verification is needed prior to disclosure of location information, then mutual authentication between LCS server 216 and mobile station 280 is performed (step 964). LCS server 216 then sends a Location Service Request message to mobile station 280 (step 966). This message has a User Verification Required field set to "1" if user verification is needed and to "0" if user verification is not needed. Mobile station 280 then verifies the user if this is required, as indicated by User Verification Required field. Mobile station 280 then sends to LCS server 216 a Location Service Response message that includes the location information for mobile station 280 (step 968). The messages exchanged between LCS server 216 and mobile station 280 in steps 966 and 968 may be signed and/or encrypted using the Session Key 2 obtained in step 964. LCS server 216 then sends to LCS provider 202x a Location Service Response message that includes the location information for mobile station 280 (step 970).

For location disclosure for both mobile-originated and mobile-terminated cases, "ownership" of location information is determined by where the location server resides (i.e., either in mobile station 280 or LCS server 216). The owner of the location information is the authority for the information and may apply its own rules and policy for disclosing the information.

If the location server is located in LCS server 216, then LCS server 216 controls the disclosure of location information regardless of where the location client may be located. LCS server 216 may optionally perform authentication and authorization if mobile station 280 is involved in location disclosure (e.g., if the location information is cached in mobile station 280).

If the location server is located in mobile station 280, then mobile station 280 controls the disclosure of location information regardless of where the location client may be located. However, sending all requests to mobile station 280 for this location information may incur extra delays. The extra delays may be caused, for example, if mobile station 280 is dormant, busy, or even out of coverage for a brief moment.

An LCS proxy may be provided in home network 210 and used as a proxy for mobile station 280 for location disclosure. Mobile station 280 may send its location information as well as its disclosure rules/policy to the LCS proxy. Requests for the location information for mobile station 280 may then be directed to the LCS proxy, which may be able to service these requests more efficiently than mobile station 280. For these requests, LCS proxy would act on behalf of mobile station 280 and apply the disclosure rules/policy of mobile station 280. The LCS proxy may also request updated location information from mobile station 280, as needed. For example, the LCS proxy may request mobile station 280 for the updated location information if a request from a location client cannot be satisfied with the current location information for mobile station 280, perhaps because it is stale or cannot meet the PQoS requirements.

5. Accounting and Billing

Accounting and billing may be performed in LCS server 216 within home network 210 and/or SMPC 256 within serving network. 250. SMPC 256 may generate a call detail record (CDR) for each location determination request. Correspondingly, LCS server 216 may generate a CDR for each location disclosure request. The CDRs may be used for accounting, billing, and/or other purposes. Table 4 lists various items that may be included in a CDR

TABLE 4

| Items | Description |
| --- | --- |
| Location Client ID | The identity of the location client requesting location information |
| Target Mobile Station ID | The identity of the target mobile station whose location is being sought (e.g., the IMSI of the target mobile station) |
| Success or Failure | Indicates whether or not location information was provided |
| Timestamp | The time the location information was determined |
| Response Time | The time at which the response was provided |
| Location Estimate | An estimate of the location of the target mobile station and the confidence in this location estimate |

Figure 10A:
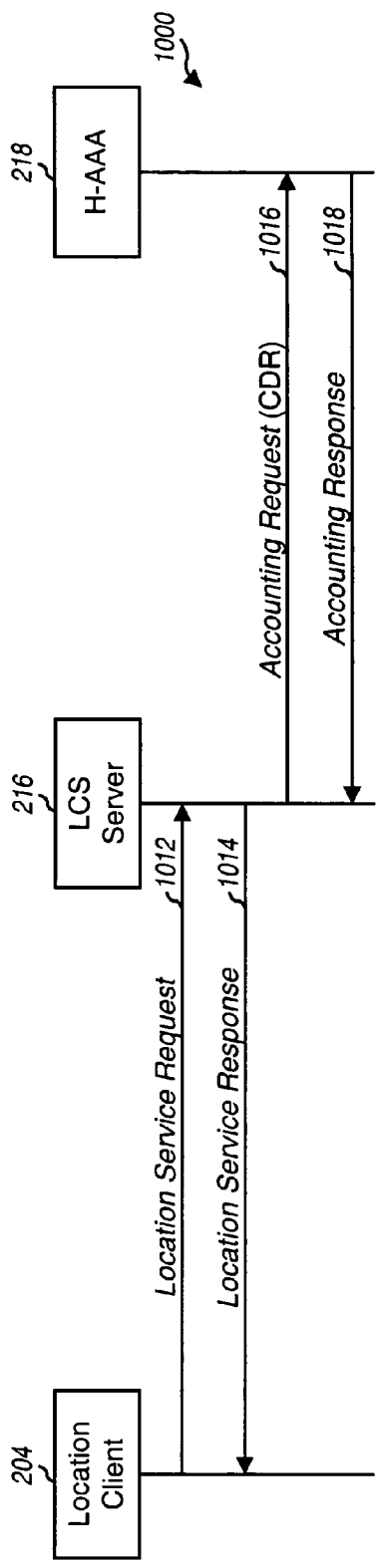
FIGS. 10A and 10B show call flows for reporting CDRs for location disclosure and location determination, respectively.

FIG. 10A shows an exemplary call flow 1000 for reporting a CDR for each location disclosure request received by LCS server 216. A location client 204 sends to LCS server 216 a Location Service Request message for location information for mobile station 280, which is the target mobile station (step 1012). Location client 204 may be mobile station 280 or LCS provider 202a, 202b, or 202c. Depending on where the location information is cached, different call flows may be used to obtain the location information, as described above. LCS server 216 then sends to location client 204 a Location Service Response message that includes the location information for mobile station 280 (step 1014). LCS server 216 generates a CDR for the disclosure of location information to location client 204. LCS server 216 then sends to H-AAA 218 an Account Request message that includes the CDR (step 1016). The CDR may be stored by H-AAA 218 and used for accounting, billing, and/or other purposes. H-AAA 218 responds by sending back an Accounting Response message (step 1018).

Figure 10B:
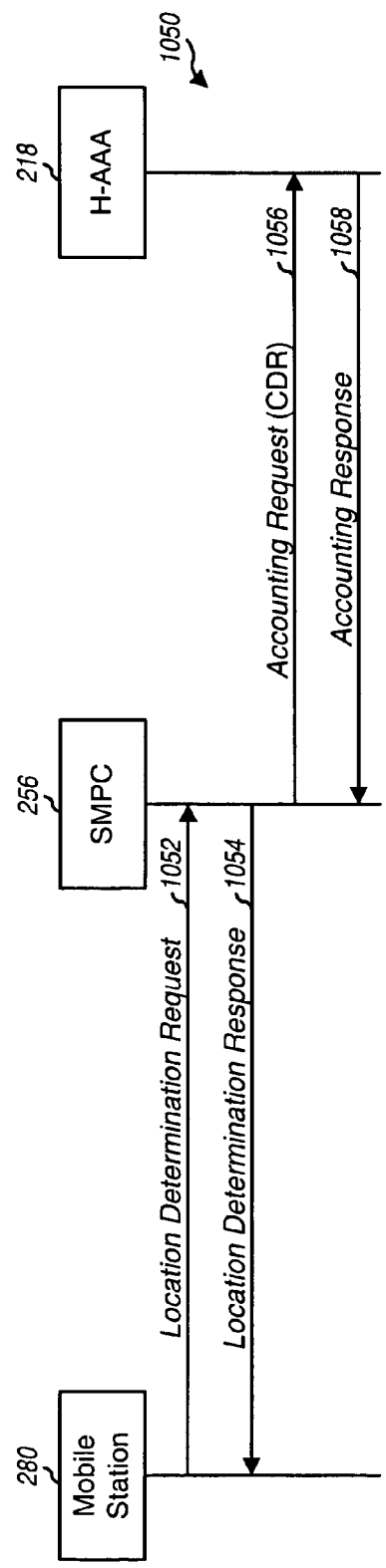

FIG. 10B shows an exemplary call flow 1050 for reporting a CDR for each location determination request received by SMPC 256. Mobile station 280 sends to SMPC 256 a Location Determination Request message to determine the location of mobile station 280 (step 1052). Various procedures may be used to determine the location of mobile station 280, as described above. SMPC 256 then sends a Location Determination Response message that includes location information for mobile station 280 (step 1054). SMPC 256 generates a CDR for the location determination request. SMPC 256 then sends to H-AAA 218 an Account Request message that includes the CDR (step 1056). The CDR may be stored by H-AAA 218 and used for accounting, billing, and/or other purposes. H-AAA 218 responds by sending back an Accounting Response message (step 1058).

6. System

Figure 11:
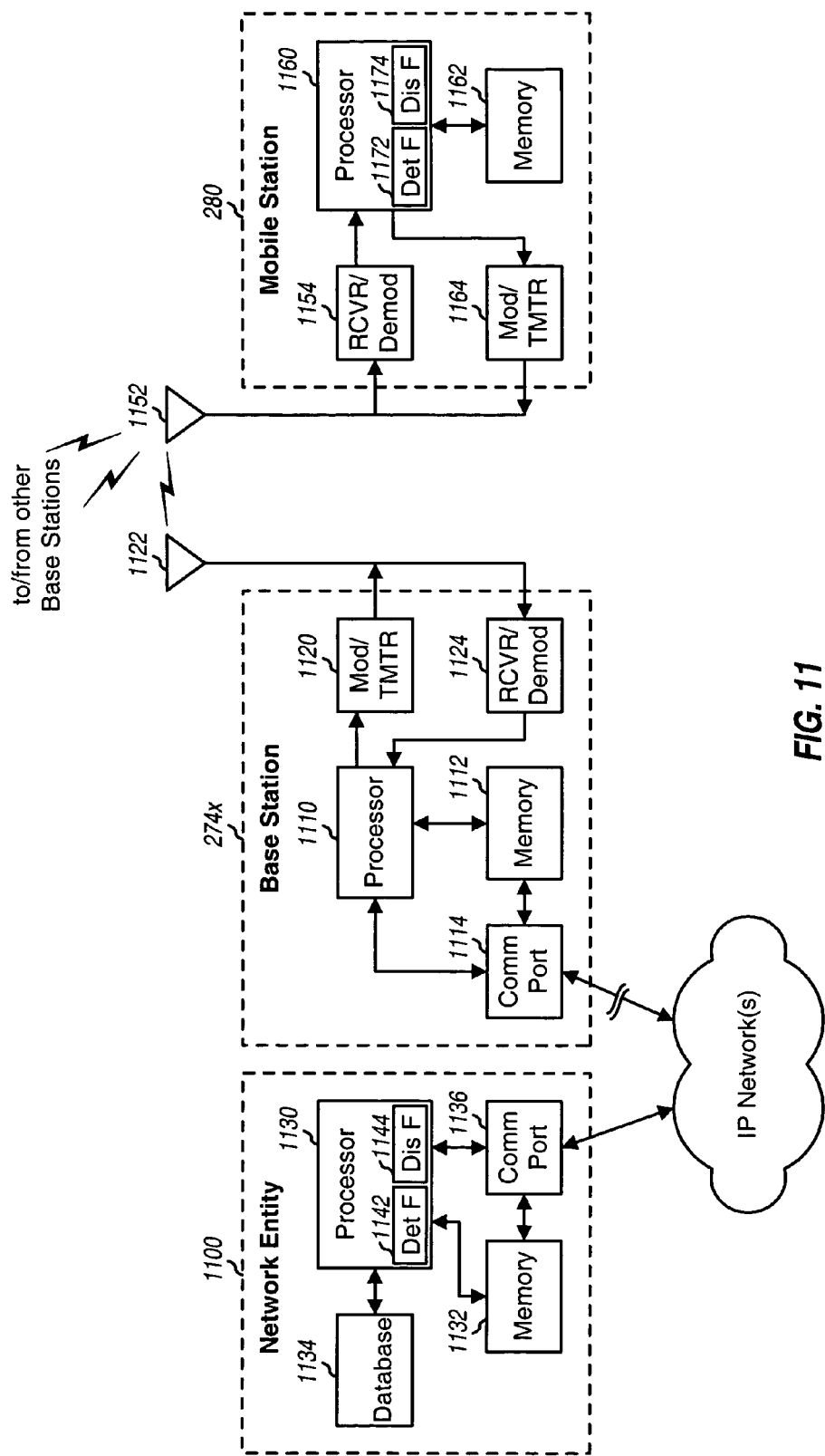
FIG. 11 shows a block diagram of various entities in the network of FIG. 2.

FIG. 11 shows a block diagram of various entities in network 200. Mobile station 280 may be a cellular telephone, a computer with a wireless modem, a stand-alone position determining unit, or some other unit. A base station 274x may perform the function of BSC/PCF 274 in FIG. 2. For simplicity, only one network entity 1100 is shown in FIG. 11. Network entity 1100 may be any of the network entities shown in FIG. 2 (e.g., LCS server 216, SMPC 256, SPDE 260, LCS provider 202a, 202b, or 202c, or some other network entity).

On the forward link, base station 274x transmits data, pilot, and signaling to the mobile stations within its coverage area. These various types of data are processed (e.g., coded, modulated, filtered, amplified, quadrature modulated, and upconverted) by a modulator/transmitter (Mod/TMTR) 1120 to provide a forward link modulated signal, which is then transmitted via an antenna 1122 to the mobile stations.

Mobile station 280 receives the forward link modulated signals from one or more base stations (which include base station 274x) at an antenna 1152. The receiver input signal from antenna 1152 (which may include a number of received signals) is provided to a receiver/demodulator (RCVR/Demod) 1154. RCVR/Demod 1154 then processes the receiver input signal in a complementary manner to provide various types of information that may be used for location determination and location disclosure. For example, RCVR/Demod 1154 may provide the time of arrival of received signals (which may be used for location determination), decoded messages used for the call flows described above, and so on. A processor 1160 performs various processing and control functions for mobile station 280, and a memory unit 1162 stores program codes and data for processor 1160.

On the reverse link, mobile station 280 may transmit data, pilot, and/or signaling to base station 274x. These various types of data are processed by a modulator/transmitter (Mod/TMTR) 1164 to provide a reverse link modulated signal, which is then transmitted via antenna 1152. Base station 274x receives the reverse link modulated signal from mobile station 280 at antenna 1122, and the receiver input signal from antenna 1122 is provided to a receiver/demodulator (RCVR/Demod) 1124. RCVR/Demod 1124 then processes the receiver input signal in a complementary manner to provide various types of information, which may then be provided to a processor 1110. Processor 1110 performs various processing and control functions for base station 274x, and a memory unit 1112 stores program codes and data for processor 1110. A communication (Comm) port 1114 allows base station 274x to exchange data with other network entities.

Within network entity 1100, a communication port 1136 allows entity 1100 to exchange data with other network entities. A processor 1130 performs various processing and control functions for entity 1100, and a memory unit 1132 stores program codes and data for processor 1130. A database 1134 may be used to store pertinent information. For example, database 1134 may implement database 222 or HLR 224 in FIG. 2.

For location determination, a location determination function (Det F) 1172 in mobile station 280 may interact with a peer location determination function 1142 in network entity 1100 to perform location determination. Functions 1142 and 1172 may implement any of the call flows described above for location determination. For location disclosure, a location disclosure function (Dis F) 1174 in mobile station 280 may interact with a peer location disclosure function 1144 in network entity 1100 to perform location disclosure. Function 1144 may implement the location client or the location server, and function 1174 may implement the location client or the location server or both. Functions 1144 and 1174 may implement any of the call flows described above for location disclosure.

The system, method and apparatus described herein may be implemented by various means, such as in hardware, software, or a combination thereof. For a hardware implementation, the system, method and apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the method described herein may be implemented with modules (e.g., procedures, functions, and so on) that perform the functions described herein. The software codes may be stored in a memory unit (e.g., memory unit 1112, 1132, or 1162 in FIG. 11) and executed by a processor (e.g., processor 1110, 1130, or 1160). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of providing location services (LCS), comprising:

receiving a request for location information for a mobile station from a location client;

determining whether suitable location information is available from a cache;

performing authorization for location distribution based on a first security procedure to determine whether the location client is authorized to receive the location information for the mobile station via a first network entity;

performing authentication for the location distribution based on the first security procedure to authenticate the location client;
performing authorization for location determination based on a second security procedure, independent of the first security procedure, to determine whether a second network entity is authorized for the location information for the mobile station;
performing authentication for the location determination based on the second security procedure to authenticate the second network entity;
performing location determination to obtain location information for the mobile station responsive to the request for the location information when the suitable location information for the mobile station is unavailable; and
performing location distribution via the first and second network entities to provide the location information for the mobile station responsive to the request for the location information, and skipping the location determination when the present location information for the mobile station is available from the cache.

2. The method of claim 1, wherein the second security procedure is based on an MD-5 algorithm and the first security procedure is based on an Authentication and Key Agreement (AKA) procedure.

3. The method of claim 1, further comprising:
performing a first session key setup to obtain a first session key, wherein the first session key is used for authentication and encryption of messages exchanged with the first network entity; and
performing a second session key setup to obtain a second session key, wherein the second session key is used for authentication and encryption of messages exchanged with the second network entity.

4. The method of claim 1, wherein the location determination and the location distribution are performed in two separate LCS sessions.

5. The method of claim 1, wherein the second network entity is located in a serving network for the mobile station and the first network entity is located in a home network for the mobile station.

6. The method of claim 1, wherein the location distribution is performed by a location client and a location server.

7. The method of claim 6, wherein the first network entity includes an LCS provider, and wherein the location client is located in the mobile station or the LCS provider.

8. The method of claim 6, wherein the first network entity includes an LCS server, and wherein the location server is located in the mobile station or the LCS server.

9. The method of claim 1, wherein the second network entity includes a position determining entity (PDE).

10. The method of claim 9, wherein the second network entity further includes a serving mobile positioning center (SMPC).

11. The method of claim 9, wherein the second network entity further includes a home authentication, authorization, and accounting entity (H-AAA).

12. The method of claim 1, wherein the first network entity includes an LCS server.

13. The method of claim 12, wherein the first network entity further includes a home authentication, authorization, and accounting (H-AAA) entity.

14. The method of claim 1, wherein the location information for the mobile station comprises a location estimate for the mobile station.

15. The method of claim 14, wherein the location information for the mobile station further comprises an uncertainty for the location estimate for the mobile station.

16. An apparatus comprising:
means for receiving a request for location information for a mobile station from a location client;
means for performing a first session key setup to obtain a first session key, wherein the first session key is used for authentication and encryption of messages exchanged between a first network entity and the mobile station;
means for performing location determination via a first secure LCS session using the first session key to obtain location information for the mobile station responsive to the request for the location information when present location information for the mobile station is unavailable from a cache;
means for performing a second session key setup to obtain a second session key, wherein the second session key is used for authentication and encryption of messages exchanged between a second network entity and the location client; and
means for performing location distribution via a second secure LCS session using the second session key, independent of the first secure LCS session, to provide the location information for the mobile station to the location client responsive to the request for the location information, and skipping the location determination when the present location information for the mobile station is available from the cache.

17. A computer program product residing on a non-transitory processor-readable medium and comprising processor-readable instructions configured to cause the processor to:
authenticate, based on a first session obtained using a first security procedure, a location client requesting location information of a mobile station via a home network;
obtain location information for the mobile station responsive to the authenticated request for location information for the mobile station when present location information for the mobile station is unavailable from a cache;
authenticate the mobile station for location determination responsive to the request for location information based on a second security procedure, independent of the first security procedure; and
provide, from a serving network, the location information to the location client responsive to the request for the location information for the mobile station, and skip obtaining the location information when the present location information for the mobile station is available from the cache.

18. A method of providing location services (LCS), comprising:
receiving a request, from a location client, for location disclosure of a mobile station;
authenticating the request using a secure disclosure session key and a secure disclosure session between a network and the location client;
determining whether cached location information is available;
if the cached location information is available, responding to the request for location disclosure with the location information in the secure disclosure session;
if the cached location information is not available, initiating a request for location determination;
establishing a secure determination session, between the network and the mobile station, independent of the secure disclosure session, to authenticate the request for location determination; and communicating location information within the secure determination session.

19. The method of claim 18, wherein authenticating the request comprises:
receiving a request for the secure disclosure session key; and
providing the secure disclosure session key in response to successful authentication and validation of the request for the secure session key.

20. The method of claim 18 wherein authenticating the request comprises mutually authenticating the location client and a first network entity of the network, and wherein establishing the secure determination session comprises mutually authenticating the mobile station and a second network entity of the network.

21. The method of claim 20 wherein the first and second network entities are a single network entity.

22. A system in a wireless communication network, the system comprising:
a home network server configured to:
receive a request from a location client for location disclosure of a mobile station;
authenticate the request using a secure disclosure session key and a secure disclosure session with the location client;
determine whether cached location information is available;
respond to the request for location disclosure with the location information in the secure disclosure session if the cached location information is available; and
initiate a request for location determination if the cached location information is not available; and
a serving network server communicatively coupled to the home network server and configured to:
establish a secure determination session, independent of the secure disclosure session, to authenticate the mobile station;
determine the location information of the mobile station; and
communicate the location information to the home network server.

23. The system of claim 22, wherein the home network server is configured to perform mutual authentication with the location client and to provide the location information to the location client, and wherein the serving network server is configured to perform mutual authentication with the mobile station.

24. The system of claim 22 wherein the home and serving network servers are a single server.

25. An apparatus comprising:
means for receiving a request for location information for a mobile station from a location client;
means for obtaining a first session key for authentication and encryption of messages exchanged between a first network entity and the mobile station;
means for exchanging information via a first secure LCS session using the first session key to determine location information for the mobile station responsive to the request for the location information only when present location information for the mobile station being unavailable from a cache;
means for obtaining a second session key for authentication and encryption of messages exchanged between a second network entity and the location client; and
means for distributing the determined location information via a second secure LCS session using the second session key, independent of the first secure LCS session, to provide the determined location information for the mobile station to the location client responsive to the request for the location information.

* * * * *